(12) United States Patent
Hayashi et al.

(10) Patent No.: US 7,208,248 B2
(45) Date of Patent: Apr. 24, 2007

(54) NEGATIVE-ELECTRODE ACTIVE MATERIAL FOR LITHIUM SECONDARY BATTERY, NEGATIVE ELECTRODE FOR LITHIUM SECONDARY BATTERY, AND LITHIUM SECONDARY BATTERY

(75) Inventors: Manabu Hayashi, Ibaraki (JP); Tomiyuki Kamada, Ibaraki (JP); Tadashi Ishihara, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/206,159

(22) Filed: Aug. 18, 2005

(65) Prior Publication Data

US 2006/0035146 A1   Feb. 16, 2006

Related U.S. Application Data

(63) Continuation of application No. PCT/JP04/01793, filed on Feb. 18, 2004.

(30) Foreign Application Priority Data

Feb. 20, 2003   (JP) ............................. 2003-042985

(51) Int. Cl.
H01M 4/58   (2006.01)
(52) U.S. Cl. ............................... 429/231.4; 429/231.95
(58) Field of Classification Search ............. 429/231.4, 429/231.95
See application file for complete search history.

(56) References Cited

FOREIGN PATENT DOCUMENTS

| | | | |
|---|---|---|---|
| EP | 1 122 803 | * | 8/2001 |
| JP | 6-295725 | | 10/1994 |
| JP | 09-326253 | | 12/1997 |
| JP | 11-329436 | | 11/1999 |
| JP | 2000-323174 | | 11/2000 |
| JP | 2001-176517 | | 6/2001 |
| JP | 2003-036839 | * | 2/2003 |
| JP | 2003-36839 | | 2/2003 |
| JP | 2003-173774 | | 6/2003 |
| JP | 2003-282061 | | 10/2003 |
| JP | 2004-103435 | | 4/2004 |
| WO | WO 98/54779 | | 12/1998 |
| WO | WO/00/22687 | | 4/2000 |

OTHER PUBLICATIONS

U.S. Appl. No. 11/206,159, filed Aug. 18, 2005, Hayashi et al.
U.S. Appl. No. 11/208,006, filed Aug. 22, 2005, Hayashi et al.
U.S. Appl. No. 11/198,840, filed Aug. 8, 2005, Hayashi et al.

* cited by examiner

*Primary Examiner*—Patrick Joseph Ryan
*Assistant Examiner*—Thomas H. Parsons
(74) *Attorney, Agent, or Firm*—Oblon, Spivak, McClelland, Maier & Neustadt, P.C.

(57) ABSTRACT

A lithium secondary battery with high-output/high-input characteristics which has a long life, and is highly safe contains a negative electrode of a negative-electrode active material. In a dispersion prepared by dispersing 100 g of the active-material powder in 200 g of water together with 2 g of carboxymethyl cellulose, the particle diameter at which particles begin to appear is 50 μm or smaller when the dispersion is examined by the grind gauge method for determining the degree of dispersion in accordance with JIS K5400.

25 Claims, 4 Drawing Sheets

NEGATIVE-ELECTRODE ACTIVE MATERIAL FOR LITHIUM SECONDARY BATTERY, NEGATIVE ELECTRODE FOR LITHIUM SECONDARY BATTERY, AND LITHIUM SECONDARY BATTERY

FIELD OF THE INVENTION

The present invention relates to a negative-electrode active material for lithium secondary battery, a negative electrode for lithium secondary battery, and a lithium secondary battery. More particularly, the invention relates to a negative-electrode active material for lithium secondary battery which is suitable for use in automotive lithium secondary battery which can have high-output/high-input characteristics based on a reduction in the thickness of an active material layer, have a long life, and are highly safe, and to a negative electrode for lithium secondary battery and a lithium secondary battery each employing the negative-electrode active material.

BACKGROUND ART

Various secondary batteries have been developed as driving power sources for notebook type personal computers, potable telephones, motor vehicles, etc. However, there is a desire for a secondary battery having high-output/high-input characteristics which is capable of being discharged/charged at a high current so as to cope with the recent trend toward function advancement and, in particular, to meet requirements for, e.g., acceleration in automotive applications.

Namely, batteries for cordless appliances such as electric drills and cutters and for electric motorcars and hybrid motor vehicles are required to drive motors at a high current. In particular, the batteries for hybrid motor vehicles need not have a high capacity but are desired to have high-output performance for causing the engine assist motor to begin to operate in a moment and to have high-input characteristics for regenerating the energy which generates when the motor vehicle stops.

On the other hand, lithium secondary batteries are superior in energy density (Wh/kg) and power density (W/kg) in low-current discharge. In high-current discharge (high-power discharge), however, lithium secondary batteries have not always exhibited excellent high-output characteristics as compared with nickel-hydrogen secondary batteries and other batteries when battery durability also is taken into account. Lithium secondary batteries are hence desired to be improved in cycle characteristics in short-time charge/discharge at a high current. This performance has not been required of the lithium secondary battery for use in mobile appliances heretofore in use.

In a lithium secondary battery, in order for the individual battery (unit cells) to be discharged at a high current so as to attain enhanced output characteristics, the electrode plates of each unit cell are desired to be thinned. For reducing the thicknesses of the unit cells, it is necessary to reduce the thicknesses of members constituting the battery, such as the positive electrodes and negative electrodes. Active material layers for lithium secondary batteries have been formed by a technique in which a dispersion (slurry) prepared by dispersing an active material capable of occluding/releasing lithium in water or an organic solvent together with an organic material having binding and thickening effects is applied to a current collector and dried. However, when an active material layer is formed in a reduced thickness, this electrode is uneven in coating amount and suffers lithium metal deposition in repetitions of charge/discharge to cause short-circuiting. The thickness reduction hence has had problems concerning battery life and safety. Especially in automotive applications, to secure safety is crucially important and that problem concerning safety has been serious.

WO 00/022687 describes a graphite powder for use as a carbonaceous material for lithium battery. This powder is a graphite powder which has specific values of specific surface area, aspect ratio, and tapping bulk density and contains substantially no particles having a particle diameter of 3 µm or smaller and/or a particle diameter of 53 µm or larger. It is pointed out in WO 00/022687 that the inclusion of coarse particles having a particle diameter of 53 µm or larger is causative of separator damage. Despite this, there is a statement in WO 00/022687 to the effect that classification conducted to such a degree that the content of particles having a particle diameter of 53 µm or larger is reduced to 1% by weight or lower is sufficient. In Examples given therein, the only sieve used for sieving is a 270-mesh sieve (53 µm) In this classification, particles having a particle diameter smaller than 53 µm remain unremoved. Furthermore, in the case of flat graphite particles, particles having a particle diameter of 53 µm or larger remain usually in an amount of about 5% by volume even when sieving with a 270-mesh sieve is conducted several times.

Use of such graphite particles containing coarse particles remaining unremoved is ineffective in overcoming the problems concerning the unevenness of an active material layer formed thinly and the lithium metal deposition caused thereby during repetitions of charge/discharge. These problems are serious especially in negative electrodes having an active material layer formed in a thickness reduced to as small as 50 µm or below.

DISCLOSURE OF THE INVENTION

An object of the invention is to eliminate those existing problems and provide a negative-electrode active material for lithium secondary battery which is capable of attaining a reduction in the thickness of active material layers, i.e., an active material which can form an even active material layer even in a thickness reduced to 50 µm or smaller and does not pose the problem of lithium metal deposition even in repetitions of charge/discharge. Another object is to provide a negative electrode for lithium secondary battery which employs the active material and can have a reduced thickness. Still another object is to provide a lithium secondary battery which employs the negative electrode and which has excellent high-output/high-input characteristics and a long life and is highly safe.

The negative-electrode active material for lithium secondary battery of the invention is a negative-electrode active material for lithium secondary battery which is in a carbonaceous powder form, and is characterized in that when a dispersion prepared by dispersing 100 g of the active-material powder in 200 g of water together with 2 g of carboxymethyl cellulose is examined by the grind gauge method for determining the degree of dispersion in accordance with JIS K5400, the particle diameter at which particles begin to appear (hereinafter referred to as "maximum dispersed-particle diameter") is 50 µm or smaller.

The present inventors made intensive investigations in order to accomplish the subject for the invention. As a result, it was found that a lithium secondary battery having high-input/high-output characteristics which, even when it has an active material layer with a reduced thickness, is prevented from suffering the problem of short-circuiting caused by lithium metal deposition in repetitions of charge/discharge and which has a long life and is highly safe can be realized by selecting properties of a negative-electrode active material. The invention has been completed based on this finding.

In the negative-electrode active material for lithium secondary battery of the invention, the number of particles having a particle diameter of 35 μm or larger and 50 μm or smaller, as determined by the grind gauge method for determining the degree of dispersion in accordance with JISK5400, preferably is 10 or smaller.

The negative electrode for lithium secondary battery of the invention comprises a current collector having provided thereon an active material layer comprising an active material and an organic material having binding and thickening effects, and is characterized in that the active material layer has a thickness of 50 μm or smaller and an arithmetic mean roughness (Ra) as measured in accordance with JIS B0601 of 5 μm or smaller.

The lithium secondary battery of the invention comprises a positive electrode capable of occluding/releasing lithium, a negative electrode capable of occluding/releasing lithium, and an electrolyte, and is characterized in that the negative electrode is the negative electrode for lithium secondary battery of the invention described above.

According to the negative-electrode active material for lithium secondary battery of the invention, an active material layer which, even when as thin as 50 μm or less, is even and free from the problem of lithium metal deposition in repetitions of charge/discharge can be formed. The negative electrode for lithium secondary battery of the invention, which has an active material layer having a thickness as small as 50 μm or below and, despite this, having a highly even surface, can have a reduced thickness, a prolonged life, and improved safety. The lithium secondary battery provided by the invention, which employs this negative electrode, has excellent high-output/high-input characteristics and a long life and is highly safe. The lithium secondary battery of the invention, which has such properties, is extremely useful industrially as, e.g., a lithium secondary battery for automotive use in which high-output characteristics are especially required.

BEST MODE FOR CARRYING OUT THE INVENTION

The invention will be explained below in more detail.

First, an explanation is given on the negative-electrode active material for lithium secondary battery of the invention.

The negative-electrode active material for lithium secondary battery of the invention is a negative-electrode active material for lithium secondary battery which is in a carbonaceous powder form. It is essential that this negative-electrode active material should satisfy the following specific properties.

Namely, when a dispersion consisting of 100 g of this active-material powder, 2 g of carboxymethyl cellulose, and 200 g of water (hereinafter, the dispersion is often referred to as "sample dispersion") is examined by the grind gauge method for determining the degree of dispersion in accordance with JIS K5400, the maximum dispersed-particle diameter at which particles begin to appear should be 50 μm or smaller.

The sample dispersion to be thus examined is a dispersion prepared by mixing the given amounts of the active-material powder, carboxymethylcellulose, and water at 25° C. for 30 minutes by means of a planetary twin-screw kneading machine at a revolution speed of 780 rpm and a rotation speed of 144 rpm.

In the invention, the particle diameter at which particles begin to appear when the sample dispersion is examined by the grind gauge method in accordance with JIS K5400 is taken as the maximum dispersed-particle diameter (distribution chart method). However, since the active material and/or the carboxymethyl cellulose in the sample dispersion to be examined is usually in the state of being aggregated in some degree, there are often cases where particles are observed as streak lines in examinations for the degree of dispersion by the grind gauge method. Consequently, in such cases, the particle diameter at which streak lines begin to appear is taken as the maximum dispersed-particle diameter (streak line method)

Measurements of the particle diameter at which particles begin to appear in the distribution chart method described above and of the particle diameter at which streak lines begin to appear in the streak line method described above will be explained below.

The methods as provided for in JIS K5400 for determining the degree of dispersion are the distribution chart method and the streak line method.

(i) Distribution Chart Method

A dispersion is poured in the grooves of a grind gauge which will be described later. The grooves are scraped with a scraper to form in each groove a dispersion layer whose thickness changes continuously. The thickness of that point of the layer at which particles begin to appear densely is read, and this value is taken as "the particle diameter at which particles begin to appear".

The grind gauge to be used is any of the grind gauges described in JIS K5400. For an understanding, these grind gauges are summarized below.

Figure 1:
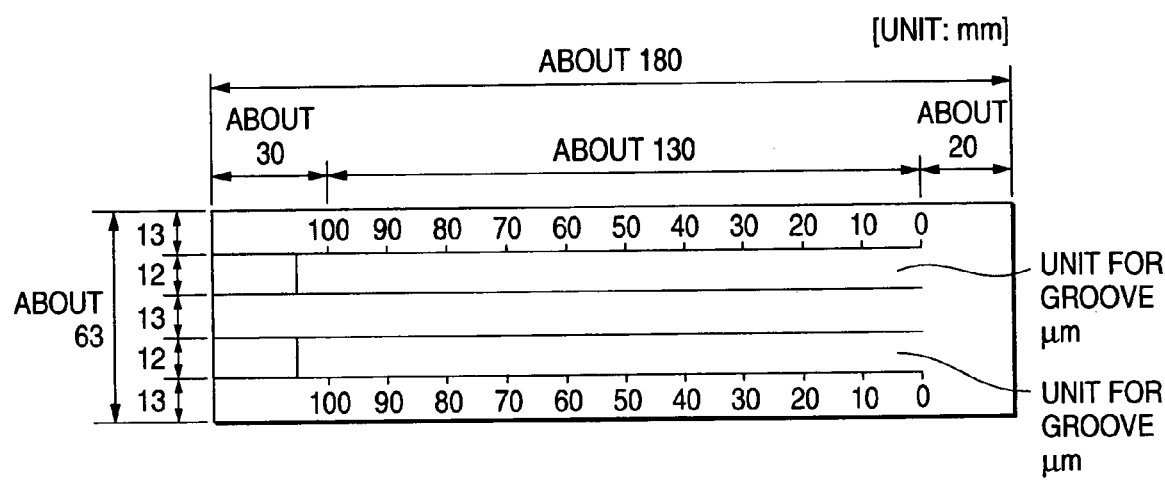
FIG. 1 is a view illustrating an example of grind gauges (100 μm) usable in the dispersion degree test as provided for in JIS K5400.
Figure 2:
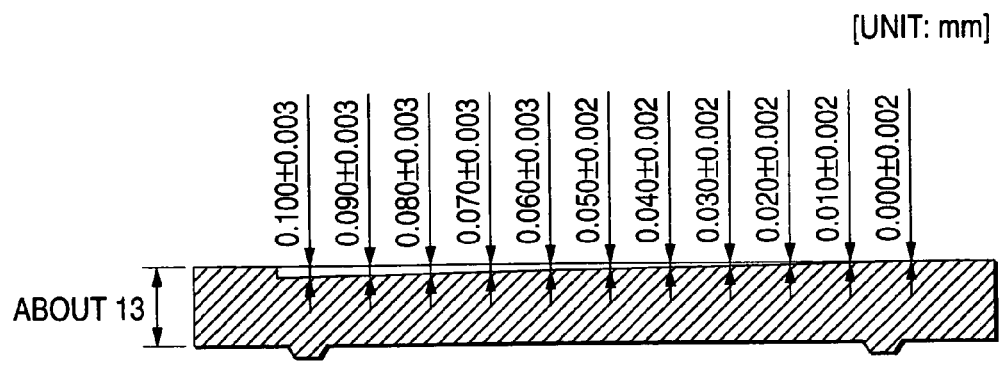
FIG. 2 is a view showing the depths of grooves in the grind gauge (100 μm) usable in the dispersion degree test as provided for in JIS K5400.
Figure 3:
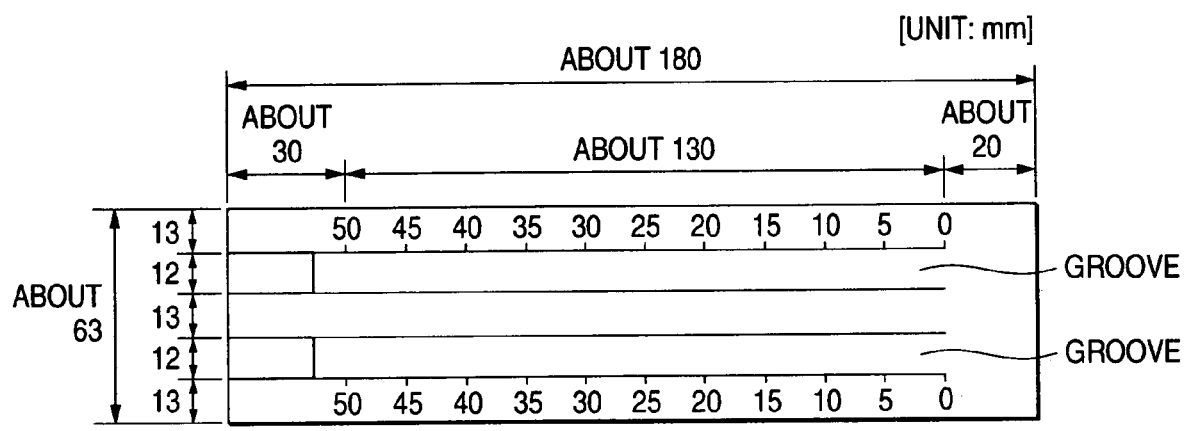
FIG. 3 is a view illustrating an example of grind gauges (50 μm) usable in the dispersion degree test as provided for in JIS K5400.
Figure 4:
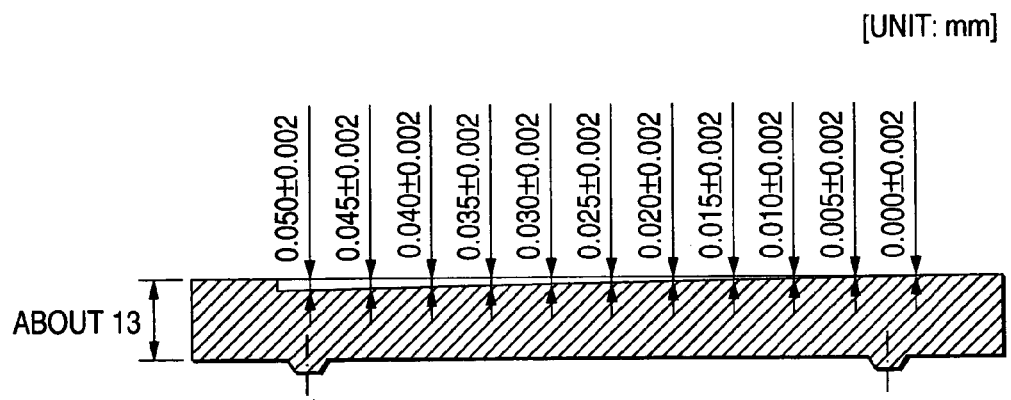
FIG. 4 is a view showing the depths of grooves in the grind gauge (50 μm) usable in the dispersion degree test as provided for in JIS K5400.
Figure 5:
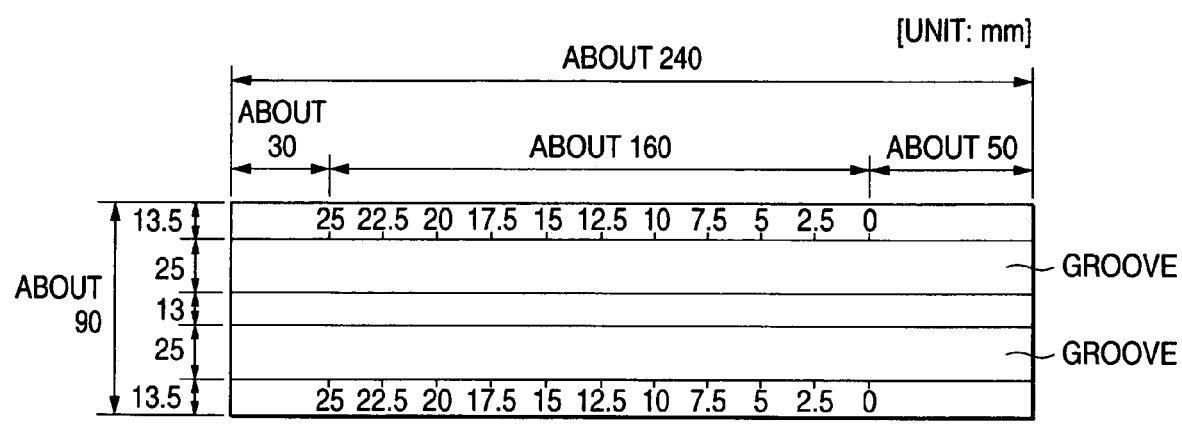
FIG. 5 is a view illustrating an example of grind gauges (25 μm) usable in the dispersion degree test as provided for in JIS K5400.
Figure 6:
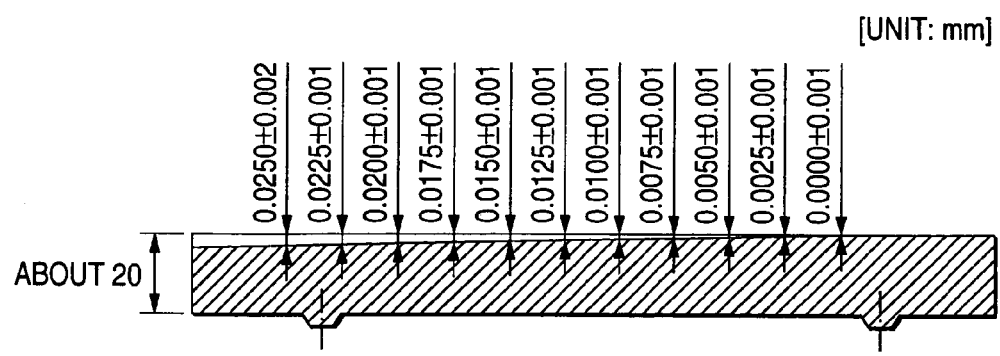
FIG. 6 is a view showing the depths of grooves in the grind gauge (25 μm) usable in the dispersion degree test as provided for in JIS K5400.
Figure 7:
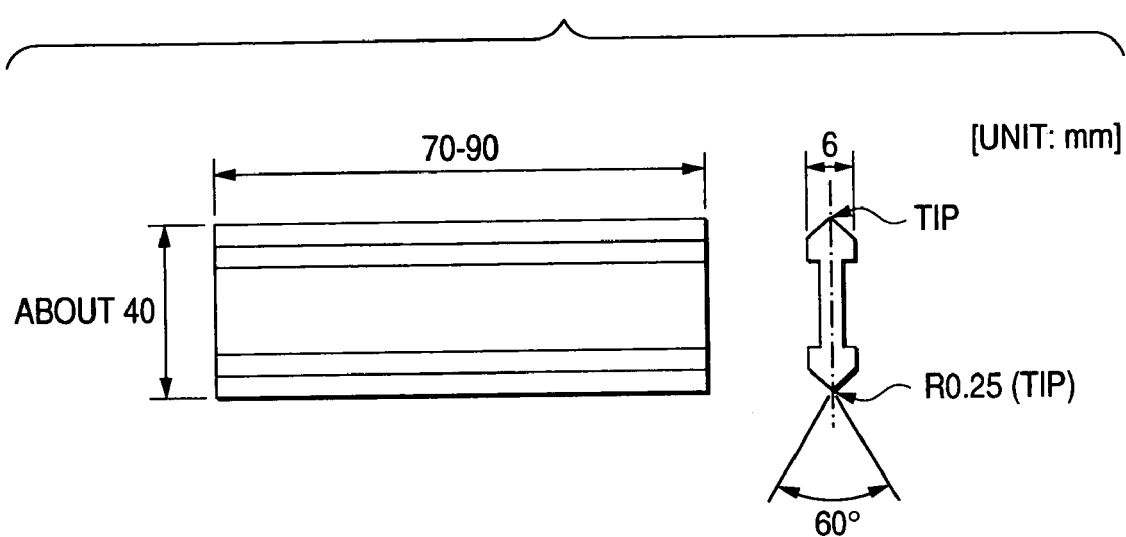
FIG. 7 is a view illustrating the shape of a scraper usable in the dispersion degree test as provided for in JIS K5400.

The grind gauges are constituted of a main body and a scraper which have the shapes and dimensions shown in FIGS. 1 to 7. The material thereof is a hardened steel. Each main body and the scraper have been finished according to Table 2. The upper face of each main body and the tips of the scraper have been finished so as to be flat. Namely, these have been finished so that when each blade of the scraper is caused to vertically meet the upper face of the grind gauge and slide thereon, no gap is formed between these except for the grooves. The examination range for each grind gauge is as shown in Table 1.

With respect to a dispersion whose degree of dispersion is unclear, a preliminary test is conducted with the grind gauge (100 μm) and the kind of grind gauge to be used is selected based on the results of this test.

TABLE 1

| Kind of grind gauge | Graduation interval (μm) | Examination range (μm) |
| --- | --- | --- |
| Grind gauge (100 μm) | 10 | 40–90 |
| Grind gauge (50 μm) | 5 | 15–40 |
| Grind gauge (25 μm) | 2.5 | 5–15 |

TABLE 2

| Application standard, JIS B 06590 (standard surface roughness piece for comparison) | | |
| --- | --- | --- |
| Classification by part | Roughness symbol | Triangle symbol |
| Grooves of grind gauge/tip of scraper | SN4 | ∇∇∇∇ |
| The other parts of grind gauge/scraper | SN5 | ∇∇∇ |

The grind gauges are used in the manner described in JIS K5400. For an understanding, however, the manner is summarized below.

(a) A grind gauge which has been cleaned is fixed on a horizontal and firm table, with the largest graduation far from the tester and the graduation 0 close to the tester.

(b) A dispersion is sufficiently stirred and, immediately thereafter, poured into deepest areas in the grooves of the grind gauge in such an amount that the dispersion slightly overflows the grooves.

(c) The length-direction ends of the scraper are held by fingertips of the hands, and the scraper is caused to almost perpendicularly meet the upper face of the grind gauge, with the blade tip on the opposite side crossing the longer sides of the grooves at a right angle at the largest graduation of the grind gauge. While the blade tip is kept being lightly pushed against the grind gauge, the scraper is pulled toward the graduation 0 (toward the tester) at a stroke over about 1 second at a constant speed.

(d) Within 5 seconds after the scraper pulling, the dispersion thus spread in the grooves by scraping are examined for particle distribution density from a direction which is perpendicular to the longer sides of the grind gauge and is obliquely above the upper face of the gauge at an angle of 20–30 degrees.

(e) After the examination, the upper face of the grind gauge is cleaned by washing with the thinner for the dispersion using a soft brush.

(f) The above examination is repeated three times.

(g) The dispersion spread is examined for particle distribution density and the graduation at which particles begin to appear densely is read. However, when the boundary where particles began to appear densely is intermediate between graduations or differs between the two grooves, then the larger graduation is read. The median for the found values obtained in the three measurements is taken as the degree of dispersion of the dispersion.

(ii) Streak Line Method

A dispersion is poured in the grooves of a grind gauge and scraped with a scraper to form in each groove a dispersion layer whose thickness changes continuously. The thickness of that point of the layer at which three or more streak lines attributable to coarse particles in the dispersion began to appear is read, and this value is taken as "the particle diameter at which particles begin to appear".

The grind gauges and scraper described above are used. The graduation at which three or more streak lines extending in parallel over at least 10 mm began to appear in the surface of the dispersion in each groove is read. However, when the boundary where particles began to appear densely is intermediate between graduations or differs between the two grooves, then the larger graduation is read. The median for the found values obtained in the three measurements is taken as the degree of dispersion of the dispersion.

The reasons why those properties of a negative-electrode active material which are specified in the invention are effective in reducing the thickness of layers of the negative-electrode active material are explained below.

A negative-electrode active material layer is generally formed by a step in which a slurry fluid prepared by dispersing a negative-electrode active material and an organic material having binding and thickening effects (hereinafter often referred to as "binder") in water or an organic solvent (hereinafter, the slurry fluid is often referred to as "active-material slurry") is thinly applied to a current collector, e.g., a metal foil, and dried and a subsequent pressing step in which the resultant coating is densified to a given thickness/density. For the step of thinly applying the active-material slurry to a current collector, use is generally made of: a method in which the active-material slurry is scraped with a blade or the like to thereby apply the slurry in a given thickness; or a method in which the slurry is ejected in a constant amount from a nozzle having a thin slit orifice and evenly applied to a current collector.

Incidentally, active-material slurries for use in forming negative-electrode active material layers contain coarse particles. Such particles may be ones which came in due to various sources during the production of the carbonaceous powder as a negative-electrode active material, or may be ones formed by aggregation or size enlargement of particles during the step of forming active material layers under the coating conditions used. However, if such coarse particles are present in an active-material slurry, these particles come to reside in the blade gap or nozzle orifice to inhibit the slurry from being sufficiently fed thereafter. Because of this, the amount of the active-material slurry applied on the current collector becomes insufficient in those areas in the current collector which correspond to the parts where coarse particles reside, and subsequent drying and pressing give an active material layer having considerable unevenness in thickness. Even in the case where the residence of coarse particles in the scraping blade or ejection nozzle, as in the case described above, does not occur, coarse particles in the active material layer after pressing are present as projections on the negative-electrode plate and are causative of considerably impaired surface evenness.

In the case where a negative electrode having an uneven negative-electrode active material layer or having surface irregularities or projections on the negative-electrode plate is used in a battery, this electrode has unevenness in current density mainly in the areas therein which have such surface irregularities. As a result of long-term repetitions of charge/discharge, lithium metal deposition occurs in areas on which current flow is concentrated and this leads to a trouble such as a fire. Consequently, the evenness of an active material layer is more precisely required of battery having a higher current density or battery for pulse charge/discharge in which a large quantity of current is caused to flow in a moment.

In WO 00/022687, which was cited above, there is a statement to the effect that coarse particles present in an active material are removed in order to prevent separator damage. However, even when the active material layer on a negative electrode plate is even in such a degree that the layer does not damage a separator, i.e., the layer does not break through the separator, this evenness is insufficient. The active material layer should have high-precision evenness sufficient to maintain evenness in current density even after long-term charge/discharge cycles.

The present inventors have found that for obtaining an electrode plate satisfying that requirement, it is important that coarse particles in an active material should be removed beforehand not by mere sieving but under specific conditions. In the course of investigating the conditions for the removal of coarse particles, the present inventors directed attention to the fact that carbonaceous particles such as graphite particles are not always spherical and the behavior thereof in an active-material slurry during the formation of an active material layer by coating cannot be seized based on the value of the diameter of a simple particle shape. The inventors examined the behavior of coarse particles in a given aqueous dispersion with respect to individual particles and ascertained the presence of those coarse particles in the active-material powder which, although contained in a small amount, exert a serious influence on the active material layer, i.e., the coarse particles which are not coarse particles merely influencing the occurrence of separator damage but coarse particles which are causative of the unevenness in current density, deposition of lithium metal, etc. described above. The inventors found out techniques for evaluation and acquisition as to what powder properties an active material should satisfy for attaining sufficient performance. The invention has been thus completed.

Namely, the conditions for the removal of coarse particles in the invention are as follows. The sample dispersion described above is examined with a grind gauge by the method according to JIS K5400 to measure the maximum dispersed-particle diameter, and a negative-electrode active material containing no coarse particles in such a degree that the value of the maximum dispersed-particle diameter, as a criterion, is 50 μm or smaller is used.

By thus examining a sample dispersion by the grind gauge method in accordance with JIS K5400, coarse particles which have come in due to various sources during the production of the negative-electrode active material in a carbonaceous powder form or coarse particles which generate by aggregation or size enlargement of particles during the step of forming an active material layer under the coating conditions to be used can be detected or predicted. In the invention, a negative-electrode active material in a carbonaceous powder form in which the particle diameter at which particles begin to appear, as determined through the examination, is 50 μm or smaller is used, whereby an active material layer having a high degree of evenness with eliminated surface irregularities is formed to thereby diminish unevenness in current density. In particular, the use of an active material which has been thus ascertained under those conditions to contain no coarse particles is presumed to produce the following effect. Even in an active material layer formed so as to have a thickness as extremely small as 50 μm or below, the coarse particles are inhibited from functioning as a kind of nucleus for lithium metal deposition in repetitions of charge/discharge. Excellent battery characteristics such as those which will be demonstrated by the Examples given later can hence be obtained.

In the invention, the upper limit of the maximum dispersed-particle diameter is 50 μm or smaller, preferably 35 μm or smaller, more preferably 30 μm or smaller, most preferably 25 μm or smaller. The lower limit thereof is 5 μm or larger, preferably 10 μm or larger. It is thought that when an active material having a maximum dispersed-particle diameter exceeding 50 μm is used to form an active material layer, the coarse particles function as a kind of nucleus for lithium metal deposition in repetitions of charge/discharge to cause lithium metal deposition to proceed and this is causative of short-circuiting. Because of this, the maximum dispersed-particle diameter is regulated to 50 μm or smaller. A preferred upper limit of the maximum dispersed-particle diameter is suitably determined in the range up to 50 μm according to the thickness of the active material layer to be formed on a negative-electrode current collector and to the evenness thereof. On the other hand, with respect to a preferred lower limit of the maximum dispersed-particle diameter, too small a value thereof tends to result in impaired suitability for high-density packing. Because of this, a preferred lower limit thereof is generally 5 μm or larger.

The negative-electrode active material for lithium secondary battery of the invention preferably is one in which when the sample dispersion is examined by the grind gauge method for determining the degree of dispersion in accordance with JIS K5400, the number of particles having a particle diameter of 35 μm or larger and 50 μm or smaller (hereinafter referred to as "number of 35–50 μm particles") is 10 or smaller. The upper limit of the number of 35–50 μm particles is more preferably 8 or smaller, especially preferably 5 or smaller. With respect to the lower limit thereof, smaller numbers are preferred. However, the lower limit thereof may be about 2.

Furthermore, the negative-electrode active material for lithium secondary battery of the invention preferably is one in which when the sample dispersion is examined by the grind gauge method for determining the degree of dispersion in accordance with JIS K5400, the particle diameter at which the proportion of streak lines in the gauge width direction reaches 50% or more (hereinafter, this particle diameter is referred to as "average dispersed-particle diameter") is generally 40 μm or smaller, preferably 35 μm or smaller, more preferably 30 μm or smaller, most preferably 25 μm or smaller. Namely, in the examination of a sample dispersion by the grind gauge method in accordance with JIS K5400, coarse particles are generally recorded as streak lines. The particle diameter at which the proportion of such streak lines in the gauge width reaches 50% or more was employed as an index to the proportion of these coarse particles in the active material.

It should be noted that the particle diameters determined by the grind gauge method in accordance with JIS K5400 as described above are not always the particle diameters of the active material powder but the particle diameters of the dispersed particles in the sample dispersion, and include, e.g., the particle diameters of aggregated particles formed by the aggregation of the active material powder and/or carboxymethyl cellulose.

The negative-electrode active material for lithium secondary battery of the invention, when examined as an active-material powder with a laser diffraction type particle diameter distribution analyzer, preferably has the following values of average particle diameter ($D_{50}$) and maximum particle diameter ($D_{max}$).

[Average Particle Diameter ($D_{50}$) of Active-Material Powder]

The average particle diameter ($D_{50}$) is the median diameter (50% particle diameter) in a volume-based particle diameter distribution obtained with a laser diffraction type particle diameter distribution analyzer. The value of this ($D_{50}$) in the carbonaceous powder of the negative-electrode active material of the invention is generally 20 μm or smaller, preferably 15 μm or smaller, more preferably 13 μm or smaller, especially preferably 10–13 μm.

Namely, the average particle diameter of an active material as measured with a laser diffraction type particle diameter distribution analyzer indicates an average size of the active-material particles, in contrast to the particle diameter as measured by the grind gauge method in accordance with JIS K5400 described above, which corresponds to the maximum particle diameter of coarse particles which can be present in an active material layer actually formed. Consequently, the value obtained with a laser diffraction type particle diameter distribution analyzer is not an index to a correlation with electrode thickness but an index which is important in relation with battery performances.

In case where the average particle diameter ($D_{50}$) of the active material exceeds the upper limit shown above, the property of diffusing lithium ions into the active material is impaired, resulting in a battery having reduced input/output characteristics. The lower limit of this average particle diameter ($D_{50}$) is generally 5 μm or larger, preferably 7 μm or larger. In case where an active material having an average particle diameter ($D_{50}$) smaller than 5 μm is used, this active material shows impaired suitability for high-density packing. Consequently, the average particle diameter ($D_{50}$) is preferably 5 μm or larger.

[Maximum Particle Diameter ($D_{max}$) of Active Material]

The upper limit of the maximum particle diameter ($D_{max}$) as measured with a laser diffraction type particle diameter distribution analyzer is generally 70 μm or smaller, preferably 60 μm or smaller, more preferably 52 μm or smaller, especially preferably 45 μm or smaller, most preferably 45–52 μm. The lower limit thereof is generally 20 μm or larger. In case where an active material having a maximum particle diameter ($D_{max}$) smaller than 20 μm is used, not only this active material shows impaired suitability for high-density packing, but also the battery electrode has a finely partitioned void structure and the movement of lithium ions therein is inhibited, resulting in a reduced battery output. Consequently, the maximum particle diameter ($D_{max}$) is preferably 20 μm or larger.

As described above, the maximum dispersed-particle diameter as measured by the grind gauge method in accordance with JIS K5400 is a value which conforms to situations in which the active material in a slurry form is actually applied to current collectors, whereas the maximum particle diameter ($D_{max}$) as measured with a laser diffraction type particle diameter distribution analyzer is the maximum particle diameter (100% particle diameter) calculated from a particle diameter distribution obtained on the assumption that the individual particles are spheres. Namely, the maximum dispersed-particle diameter as measured by the grind gauge method in accordance with JIS K5400 indicates the size and number of coarse particles which are an obstacle to the formation of an even electrode plate. Furthermore, in the case of, e.g., particles which are flat and have anisotropy, there is a high possibility that these particles, in a measurement for determining that maximum dispersed-particle diameter, might be distributed, with the directions of the major axes thereof in parallel with the gauge plane. There are hence cases where a value smaller than the maximum particle diameter ($D_{max}$) measured with a laser diffraction type particle diameter distribution analyzer is obtained.

Furthermore, it is preferred that the upper limit of the BET specific surface area of the negative-electrode active material for lithium secondary battery of the invention, as measured by the nitrogen gas adsorption method, be generally 13 $m^2/g$ or smaller, preferably 8 $m^2/g$ or smaller, more preferably 5 $m^2/g$ or smaller, especially preferably 2.5–4.5 $m^2/g$, and the lower limit thereof be generally 1 $m^2/g$ or larger, preferably 2 $m^2/g$ or larger, more preferably 2.5 $m^2/g$ or larger. In case where the value of this specific surface area exceeds that upper limit, durability in storage is apt to deteriorate. In case where the value thereof is smaller than that lower limit, input/output characteristics are apt to deteriorate.

Next, the carbonaceous powder material constituting the negative-electrode active material for lithium secondary battery of the invention is explained.

The term "carbonaceous" as used for the active material is not particularly limited as long as the active material comprises a carbonaceous material capable of occluding and releasing lithium. Examples thereof include graphitic, amorphous, and graphitic/amorphous composite materials. Any of these may be used in the invention.

The graphitic material is a graphitic carbon selected from artificial graphite, natural graphite, graphite derived from mesophase pitch, graphitized carbon fibers, highly purified products obtained from these, products obtained by the reheating of these, and mixtures of these. Examples of forms thereof include: mixed particles in which graphitic carbon particles of different kinds coexist; and particles each made up of many fine graphitic carbon particles isotropically bonded to one another. A graphitic material in the following powder state is preferred.

Namely, it is preferred to use a graphite powder in which the interplanar spacing $d_{002}$ for the crystal face (002) is 0.348 nm or smaller and the thickness of superposed layers $L_c$ is 10 nm or larger. More preferred is one in which the interplanar spacing $d_{002}$ for the crystal face (002) is 0.338 nm or smaller and the thickness of superposed layers $L_c$ is 20 nm or larger. Most preferred is one in which the interplanar spacing $d_{002}$ for the crystal face (002) is 0.337 nm or smaller and the thickness of superposed layers $L_c$ is 40 nm or larger.

The theoretical capacity per g of carbon in terms of $C_6Li$, which is an intercalation compound formed by the introduction of lithium ions between graphite layers, is 372 mAh. The closer the specific capacity of the graphitic material thus selected to that theoretical value, the more the material is advantageously used. Specifically, the specific capacity of the graphitic material, as measured in an electrical-capacity measurement with a half battery employing lithium metal as the counter electrode at a charge/discharge rate of 0.2 $mA/cm^2$, is preferably 320 mAH/g or higher, more preferably 340 mAh/g or higher, even more preferably 350 mAH/g or higher.

The amorphous material to be used preferably is a carbonaceous powder in which the interplanar spacing $d_{002}$ for the crystal face (002) is 0.349 nm or larger and the thickness of superposed layers $L_c$ is smaller than 10 nm. More preferred is one in which the interplanar spacing $d_{002}$ for the crystal face (002) is 0.349 nm or larger and 0.355 nm or smaller and the crystallite thickness in the c-axis direction $L_c$ is 7 nm or smaller. With respect to $L_c$, in particular, one in which $L_c$ is 1.5–10 nm, especially 1.5–5 nm, is most preferred.

Examples of forms of the amorphous material include mixed particles in which amorphous carbon particles of different kinds coexist and particles each made up of many fine amorphous carbon particles bonded to one another.

The graphitic/amorphous composite material is not particularly limited as long as it is in a form comprising the graphitic material and amorphous material described above. Examples thereof include materials obtained by partly or wholly coating a graphitic powder with an amorphous material, mixtures of a graphitic powder and an amorphous material, and an artificial graphite comprising many fine graphite particles bonded to one another at least partly isotropically through an amorphous material or graphitized amorphous material. Of these, the materials obtained by partly or wholly coating a graphitic powder with an amorphous material are suitable for use especially in applications such as large driving power sources, electric motorcars, and hybrid motor vehicles because performances such as high capacity, high-output characteristics, and high-current pulse cycle durability are obtained therewith.

The negative-electrode active material in a carbonaceous powder form of the invention, which may be any of those graphitic and amorphous materials and the like, preferably has the following properties. In a Raman spectrum obtained with argon ion laser light having a wavelength of 514.3 nm, when the intensity at the peak appearing in the 1,580–1,620 $cm^{-1}$ range in the spectrum, the half-value width of the peak, and the intensity at the peak appearing in the 1,350–1,370 $cm^{-1}$ range are expressed as IA, $\Delta v$, and IB, respectively, then the upper limit of the peak intensity ratio R (=IB/IA) is preferably 0.7 or smaller, more preferably 0.5 or smaller, even more preferably 0.3 or smaller. The lower limit of the peak intensity ratio R is preferably 0.01 or larger. Furthermore, it is preferred that the upper limit of the half-value width $\Delta v$ be 60 $cm^{-1}$ or smaller, preferably 40 $cm^{-1}$ or smaller, more preferably 30 $cm^{-1}$ or smaller, especially preferably 24 $cm^{-1}$ or smaller. The smaller the lower limit of the half-value width $\Delta v$, the better. In general, however, the lower limit thereof is 14 $cm^{-1}$ or larger.

Processes for producing a carbonaceous material to be applied to the active material of the invention are not particularly limited. For example, the target material can be obtained from any of the carbon precursors shown below by carbonizing or graphitizing the precursor by suitably changing burning conditions.

In this case, the carbon precursor to be carbonized in a liquid phase may be one or more organic compounds capable of carbonization which are selected from coal tar pitches ranging from soft pitch to hard pitch and coal-derived heavy oils such as oils obtained by dry distillation/liquefaction, petroleum-derived heavy cracking oils, such as ethylene tar, which are yielded as by-products in the thermal cracking of straight-run heavy oils from topping residues or vacuum distillation residues or of crude oil, naphtha, etc., aromatic hydrocarbons such as acenaphthylene, decacyclene, anthracene, and phenanthrene, nitrogenous-ring compounds such as phenazine and acridine, sulfurized-ring compounds such as thiophene and bithiophene, polyphenylenes such as biphenyl and terphenyl, organic polymers such as poly(vinyl chloride), poly(vinyl alcohol), poly(vinylbutyral), insolubilizedpolymers obtained from these, nitrogen-containing organic polymers, e.g., polyacrylonitrile and polypyrrole, polythiophene, which is a sulfur-containing polymer, and polystyrene, natural polymers such as polysaccharides represented by cellulose, lignin, mannan, poly(galacturonic acid), chitosan, and saccharose, thermoplastic resins such as poly(phenylene sulfide) and poly(phenyleneoxide), thermoset resins such as furfuryl alcohol resins, phenol-formaldehyde resins, and imide resins, mixtures of these substances with a low-molecular organic solvent such as benzene, toluene, xylene, quinoline, or n-hexane, and the like.

A general technique for obtaining a negative-electrode active material for lithium secondary battery which is in a carbonaceous powder form is explained below.

In producing a negative-electrode active material in a carbonaceous powder form, a graphitic powder and/or an amorphous powder is pulverized and classified first. Any pulverizer can be used for the pulverization of a graphitic powder and/or an amorphous powder as long as it can pulverize the powder into particles in a preferred particle diameter range. Examples thereof include high-speed pulverizers (e.g., hammer mill and pin mill), various ball mills (e.g., rolling type, vibration type, and planetary type), agitation mills (e.g., bead mill), screen mills, turbo mills, and jet mills. The pulverization can be conducted by either a wet process or a dry process.

For classifying the resultant powder for obtaining particles in a given particle diameter range, any operation capable of separating the particles may be used. The classification may be conducted by either a wet process or a dry process. Use can be made of a wet or dry sieving process, an air classifier such as a forced cyclone type centrifugal classifier (e.g., Micron Separator, Turboplex, Turboclasifier, or Super Separatior) or an inertial classifier (e.g., Elblow Jet), or a wet process for sedimentation separation or centrifugal classification.

In the case where mixed particles in which graphitic carbon particles of different kinds coexist are to be used as a graphitic material in the invention, graphitic carbon particles of desired kinds may be suitably mixed in a desired proportion. In the case where particles each made up of many fine graphitic carbon particles isotropically bonded to one another are to be used as a graphitic material, these particles preferably are produced, for example, in the following manner. Fine graphitic carbon particles of one or more kinds are mixed with a carbon precursor optionally together with a solvent (usually, an organic solvent such as an aromatic hydrocarbon solvent, e.g., toluene or xylene) by means of a mixing machine or kneading machine. This mixture is heat-treated at a temperature which is generally about 2,800° C. or higher, in particular about 2,900° C. or higher and is generally about 3,500° C. or lower, in particular about 3,100° C. or lower, until a crystal structure equal to that of the fine graphitic carbon particles is formed, generally under such conditions that the mixture is less apt to oxidize. For example, the mixture is burned in a vacuum, in an atmosphere of a volatile gas generated from the mixture or a raw material in the course of heat treatment, or in an inert gas atmosphere such as nitrogen. Thereafter, the product of burning is suitably pulverized and classified to regulate the resultant particles so as to have a desired particle size. In this operation, after the fine graphitic carbon particles are mixed with a carbon precursor and optionally with a solvent, this mixture is generally molded into a block, rod, or another shape before being subjected to heating and burning treatment.

Examples of the mixing machine to be used here include vertical or horizontal mixing machines such as a high-speed shearing mixer, bead mill, Henschel mixer, and mixer having a mixing vessel having, disposed therein, a shaft and stirring blades fixed to the shaft on different phases. Examples of the kneading machine include an apparatus of the so-called kneader type having a mixing vessel in which a stirring blade of the sigma type or another type rotates along the side wall and a single-screw or twin-screw kneader in general use for resin processing, etc.

In the case where mixed particles in which amorphous carbon particles of different kinds coexist are to be used as an amorphous material in the invention, amorphous carbon particles of desired kinds may be suitably mixed in a desired proportion. In the case where particles each made up of many fine amorphous carbon particles bonded to one another are to be used as an amorphous material, these particles preferably are produced, for example, in the following manner. Fine amorphous carbon particles of one or more kinds are mixed with a carbon precursor optionally together with a solvent (usually, an organic solvent such as an aromatic hydrocarbon solvent, e.g., toluene or xylene) by means of a mixing machine or kneading machine. This mixture is heat-treated at a temperature at which the carbon precursor does not grow into a graphite structure, i.e., at a temperature which is generally about 700° C. or higher, preferably about 800° C. or higher, in particular about 1,000° C. or higher, and is generally about 2,800° C. or lower, in particular about 2,000° C. or lower, especially about 1,500° C. or lower, generally under such conditions that the mixture is less apt to oxidize. For example, the mixture is burned in a vacuum, in an atmosphere of a volatile gas generated from the mixture or a raw material in the course of heat treatment, or in an inert gas atmosphere such as nitrogen. Thereafter, the product of burning is suitably pulverized and classified to regulate the resultant particles so as to have a desired particle size. Examples of the mixing machine to be used here include vertical or horizontal mixing machines such as a high-speed shearing mixer, bead mill, Henschel mixer, and mixer having a mixing vessel having, disposed therein, a shaft and stirring blades fixed to the shaft on different phases. Examples of the kneading machine include an apparatus of the so-called kneader type having a mixing vessel in which a stirring blade of the sigma type or another type rotates along the sidewall and a single-screw or twin-screw kneader in general use for resin processing, etc.

In the invention, a mixture of a graphitic powder and an amorphous powder in any desired ratio may be used according to the intended use of the battery. In this case, although a graphitic powder and an amorphous powder can be mixed in any ratio, the proportion by weight of the graphitic powder is preferably 50% or higher, more preferably 70% or higher, based on the sum of the graphitic powder and the amorphous powder. In case where the proportion of the amorphous powder to the sum of the graphitic powder and the amorphous powder is too high, the influence of irreversible capacity, which is characteristic of amorphous materials, is enhanced. Consequently, the proportion of the amorphous powder is generally preferably 40% or lower.

Furthermore, a powder which is a composite comprising a graphitic powder as the base and an amorphous powder united therewith can also be used as an active material in the invention. In this case, the graphitic powder to be used as the base can be selected from ones which satisfy the requirements for graphitic carbon described above and further satisfy the following requirements concerning particle diameter and specific surface area. On the other hand, the amorphous material to be united with the base can be selected from ones which satisfy the requirements for amorphous carbon described above.

The preferred ranges of the particle diameter and specific surface area of the graphitic powder to be used as the base are as follows. The average particle diameter ($D_{50}$) thereof as measured with a laser diffraction type particle diameter distribution analyzer is generally 20 μm or smaller, preferably 15 μm or smaller, more preferably 13 μm or smaller, especially preferably 8–13 μm. The BET specific surface area thereof is 15 $m^2/g$ or smaller, preferably from 2 $m^2/g$ to 13 $m^2/g$, more preferably from 3 $m^2/g$ to 12 $m^2/g$, most preferably from 8 $m^2/g$ to 12 $m^2/g$.

For producing the composite comprising a graphitic material and an amorphous material, use can be made, for example, of: a method in which a carbon precursor for obtaining an amorphous material is used as it is to prepare a mixture of the carbon precursor and a graphitic powder and this mixture is heat-treated and then pulverized to obtain a composite powder; a method in which the amorphous powder described above is produced beforehand and mixed with a graphitic powder and this mixture is heat-treated to obtain a composite; or a method in which the amorphous powder described above is produced beforehand and mixed with a graphitic powder and a carbon precursor and this mixture is heat-treated to obtain a composite. In the latter two methods, in which an amorphous powder is prepared beforehand, it is preferred to use amorphous particles having an average particle diameter not larger than one-tenth the average particle diameter of the graphitic particles.

In general, a mixture obtained by mixing either such graphitic particles or a mixture of such graphitic particles and amorphous particles with a carbon precursor is heated to obtain an intermediate, which is then carbonized/burned and pulverized, whereby a graphitic/amorphous composite powder comprising graphitic particles and an amorphous material united therewith can be finally obtained. The proportion of the amorphous material in this graphitic/amorphous composite powder is desirably regulated so as to be 50% by weight or lower, preferably 25% by weight or lower, more preferably 15% by weight or lower, especially preferably 10% by weight or lower and be 0.1% by weight or higher, preferably 0.5% by weight or higher, more preferably 1% by weight or higher, especially preferably 2% by weight or higher.

Processes for obtaining such a graphitic/amorphous composite powder generally comprise the following four steps.

First step: Either graphitic particles or mixed particles comprising graphitic particles and amorphous particles are mixed with a carbon precursor and optionally with a solvent by means of any of various commercial mixing machines, kneading machines, and the like to obtain a mixture.

Second Step: According to need, the mixture is heated with stirring to obtain an intermediate from which the solvent has been removed.

Third step: The mixture or intermediate is heated to a temperature which is 700° C. or higher and 2,800° C. or lower in an inert gas atmosphere such as nitrogen gas, carbon dioxide gas, or argon gas to obtain a graphitic/amorphous composite material.

Fourth Step: According to need, the composite material is subjected to powder processings such as pulverization, disaggregation, and classification.

Of these steps, the second and fourth steps can be omitted in some cases, and the fourth step may be conducted before the third step.

With respect to conditions for the heat treatment in the third step, heat history temperature conditions are important.

The lower limit of the temperature for the treatment is generally 700° C. or higher, preferably 900° C. or higher, although it slightly varies depending on the kind of the carbon precursor and the heat history thereof. With respect to the upper limit thereof, the temperature can basically be elevated to a temperature at which the amorphous material does not come to have a structural order which is higher than the crystal structure of the graphitic particle cores. Consequently, the upper limit of the temperature for the heat treatment preferably is in the range of generally 2,800° C. or lower, preferably 2,000° C. or lower, more preferably 1,500° C. or lower. Among conditions of this heat treatment, conditions such as heating rate, cooling rate, and heat treatment time can be determined at will according to purposes. It is also possible to use a method in which the mixture is heat-treated in a relatively low-temperature region and then heated to a given temperature. Incidentally, the reactor to be used in the steps may be of the batch type or the continuous type, and one reactor or two or more reactors may be used.

The composite material thus obtained by uniting an amorphous material with a graphitic material preferably is one whose degree of crystallinity, in terms of the values of the peak intensity ratio R and the half-value width $\Delta v$ of the peak appearing around 1,580 cm$^{-1}$ in Raman spectroscopy and the values of the $d_{002}$ and $L_c$ obtained in an X-ray wide-angle diffraction pattern, is not higher than that of the graphitic material. Namely, the composite material preferably has a value of R not lower than that of the graphitic material, a value of half-value width $\Delta v$ not lower than that of the graphitic material, a value of $d_{002}$ not lower than that of the graphitic material, and a value of $L_c$ not higher than that of the graphitic material. Specific examples of the value of R of the graphitic/amorphous composite powder material include one which is in the range of from 0.01 to 1.0, preferably from 0.05 to 0.8, more preferably from 0.2 to 0.7, even more preferably from 0.3 to 0.5, and is not lower than that of the graphitic material serving as the base.

This graphitic/amorphous composite powder material combines high-output characteristics, which are produced because the material has a low-potential charge/discharge curve which is characteristic of graphitic carbon, and excellent lithium-accepting properties characteristic of amorphous carbon. The composite powder material hence enables high-output characteristics and high pulse durability to be obtained. Consequently, the composite powder is more suitable for use as the active material of the invention. This is more remarkable in applications such as large driving power sources and electric motorcars, especially hybrid motor vehicles.

A method for preparing a negative-electrode active material for lithium secondary battery of the invention which is in a carbonaceous powder form produced in the manner described above and satisfies the requirements concerning the specific maximum dispersed-particle diameter, number of 35–50 μm particles, average dispersed-particle diameter, etc. is explained below.

Hitherto, negative-electrode active materials for use in lithium secondary battery have been prepared by pulverizing a graphitic powder, amorphous powder, or graphitic/amorphous composite powder and classifying the pulverized particles. However, in ordinary techniques of classification heretofore in use, even when the opening size of a sieve is selected, flat particles and the like undesirably pass through the sieve and such coarse particles which have come into the treated powder cannot be removed. Even if such coarse particles do not cause separator damage, they have exerted adverse influences on battery performances, e.g., by serving nuclei for lithium metal deposition in the active material layer.

In the invention, the following technical contrivances, for example, are taken in order to obtain an active material which satisfies the requirements concerning the specific maximum dispersed-particle diameter, number of 35–50 μm particles, average dispersed-particle diameter, etc. described above.

(1) A sieving operation is repeated to thereby remove coarse particles without fail. In general, an ASTM 400-mesh sieve or a finer sieve is used to repeatedly conduct a sieving operation 2 times or more, preferably 4 times or more, whereby flat particles are sieved to remove coarse particles without fail.

(2) A wet type sieve is used to heighten the efficiency of classification.

For example, in a preferred method, a liquid having no reactivity with the active-material powder, such as water or an alcohol, e.g., ethanol, or a mixture of such liquids is used as a medium to prepare a suspension so that this suspension on a sieve retains a solid concentration which is generally about 1% by weight or higher, in particular about 5% by weight or higher, and is generally about 20% by weight or lower, in particular about 10% by weight or lower. In case where the solid concentration of this suspension exceeds 20% by weight, the active-material powder is apt to cause clogging and productivity tends to decrease. Furthermore, although the movement of coarse particles toward the surface of the medium over the sieve enables the separation to be conducted with higher certainty, solid concentrations exceeding 20% by weight tend to inhibit coarse particles from moving toward the surface of the medium. On the other hand, in case where the solid concentration is lower than 1% by weight, productivity decreases and flat coarse particles are apt to have a larger, rather than smaller, chance of rotating and passing through openings of the sieve.

It is preferred to conduct a treatment in which the suspension is passed through such a wet type sieve 2 or more times, especially 4 or more times. It is possible to use the air classifier which will be described below and the wet type classifier in combination.

(3) Air classification is repeatedly conducted generally 2 or more times, preferably 4 or more times, to thereby remove coarse particles without fail. Although the upper limit of the number of repetitions of the classification cannot be unconditionally specified because it varies depending on the nature of the active material being treated, it is generally about 10 or smaller, in particular about 8 or smaller.

In case where the air classifier used has too high an air flow, an active-material powder containing coarse particles remaining therein is undesirably discharged. In case where the active-material powder to be treated is supplied in too large an amount, the energy received per particle from the air flow is small and the regulation of a classification point is difficult, making it difficult to produce the target active-material powder. Furthermore, in the air classification of flat active-material particles, there is a tendency that the coarser the particles, the larger the difference in resistance depending on the direction from which the air flow strikes. Consequently, a higher degree of contrivance for control is necessary.

For conducting air classification with higher certainty, it is preferred to reduce the amount of the powder to be treated and to thereby enable coarse particles to fall smoothly without accompanying small particles in the air flow and thus floating and coming into the treated powder. For efficiently obtaining a powder containing no coarse particles through classification, it is effective to reduce the amount of the feed material to be supplied. In this connection, the degree of this reduction is preferably such that the powder feed amount is from one-fourth to one-third the amount used under general conditions heretofore in use for powders containing coarse particles.

It is also important to take, for example, a contrivance in which in the powder classification chamber, the air flow space ranging from the air flow introduction part to the discharge opening for discharging an air flow containing the target powder is prolonged in the vertical direction.

Specific conditions for air classification include the following. In the air classification of a powder having an average particle diameter ($D_{50}$) of 20 μm or smaller with an industrial classifier, a gas flow having no reactivity with the active-material powder, generally air, is supplied at a rate whose lower limit is generally 5 m$^3$/min or higher, in particular 10 m$^3$/min or higher, and whose upper limit is generally 80 m$^3$/min or lower, in particular 50 m$^3$/min or lower, to thereby classify the powder at a treatment rate whose lower limit is generally 0.5 kg/min or higher, in particular 1 kg/min or higher, and whose upper limit is generally 10 kg/min or lower, in particular 8 kg/min or lower.

Next, the negative electrode for lithium secondary battery of the invention is explained.

The negative electrode for lithium secondary battery of the invention comprises a current collector having provided thereon an active material layer comprising a negative-electrode active material and an organic material having binding and thickening effects (hereinafter, the layer is sometimes referred to as "negative-electrode mix layer"). This negative electrode is characterized in that the active material layer has a thickness of 50 μm or smaller and an arithmetic mean roughness (Ra) as measured in accordance with JIS B0601 of 5 μm or smaller. Although the active material layer has such a reduced thickness, a lithium secondary battery having excellent long-term pulse charge/discharge cycle characteristics can be realized as long as the active material layer has a highly even surface, as will be shown in the Examples given later.

Incidentally, the surface roughness (Ra) is determined through a measurement with a laser microscope in accordance with JIS B0601 with respect to a measuring range which is about 10 times the average particle diameter ($D_{50}$) measured with a laser diffraction type particle diameter distribution analyzer and through a calculation. This measuring range is generally 100 μm, which is adequate to conduct the measurement, although the measuring range depends on the particle diameter of the active-material powder.

The upper limit of the surface roughness (Ra) of this active material layer is 5 μm or lower, preferably 2 μm or lower. The lower the lower limit, the better. However, as long as the surface roughness is about 0.1 μm, lithium metal deposition can be prevented without fail.

In general, an active material layer is frequently formed on each side of a current collector. According to the negative electrode for lithium secondary battery of the invention, the thickness of one active material layer (one side) can be reduced to 100 μm or smaller, in particular 80 μm or smaller, especially 50 μm or smaller, and particularly 40 μm or smaller, e.g., 30–40 μm.

This active material layer of the negative electrode for lithium secondary battery of the invention can be realized by using the above-described negative-electrode active material for lithium secondary battery of the invention as the active material.

As stated above, the negative-electrode active material layer (negative-electrode mix layer) is generally formed by a step in which a slurry fluid prepared by dispersing the negative-elect-rode active material and an organic material having binding and thickening effects in an aqueous solvent or an organic solvent is thinly applied to a current collector, e.g., a metal foil, and dried and a subsequent pressing step in which the resultant coating is densified to a given thickness/density. It is preferred that the density of the negative-electrode active material layer (negative-electrode mix layer) be generally 0.9 g/cm$^3$ or higher, in particular 1.2 g/cm$^3$ or higher, especially 1.5 g/cm$^3$ or higher and be generally 2.2 g/cm$^3$ or lower, in particular 1.9 g/cm$^3$ or lower, especially 1.7 g/cm$^3$ or lower.

The organic material having binding and thickening effects which is used for forming the negative-electrode active material layer is not particularly limited. Generally, however, the material may be either a thermoplastic resin or a thermosetting resin. Preferred examples of the binder in the invention include polyethylene, polypropylene, polytetrafluoroethylene (PTFF), poly(vinylidene fluoride) (PVDF), styrene/butadiene rubbers, tetrafluoroethylene/hexafluoroethylene copolymers, tetrafluoroethylene/hexafluoropropylene copolymers (FEP), tetrafluoroethylene/perfluoro(alkyl vinyl ether) copolymers (PFA), vinylidene fluoride/hexafluoropropylene copolymers, vinyldidene fluoride/chlorotrifluoroethylene copolymers, ethylene/tetrafluoroethylene copolymers (ETFE resins), polychlorotrifluoroethylene (PCTFE), vinylidene fluoride/pentafluoropropylene copolymers, propylene/tetrafluoroethylene copolymers, ethylene/chlorotrifluoroethylene copolymers (ECTFE), vinylidene fluoride/hexafluoropropylne/tetrafluoroethylene copolymers, vinylidene fluoride/perfluoro(methyl vinyl ether)/tetrafluoroethylene copolymers, ethylene/acrylic acid copolymers or these materials crosslinked with ($Na^+$) ions, ethylene/methacrylic acid copolymers or these materials crosslinked with ($Na^+$) ions, ethylene/methyl acrylate copolymers or these materials crosslinked with ($Na^+$) ions, and ethylene/methyl methacrylate copolymers or these materials crosslinked with ($Na^+$) ions. These materials can be used alone or as a mixture thereof. More preferred materials among those materials are styrene/butadiene rubbers, poly(vinylidene fluoride), ethylene/acrylic acid copolymers or these materials crosslinked with ($Na^+$) ions, ethylene/methacrylic acid copolymers or these materials crosslinked with ($Na^+$) ions, ethylene/methyl acrylate copolymers or these materials crosslinked with ($Na^+$) ions, and ethylene/methyl methacrylate copolymers or these materials crosslinked with ($Na^+$) ions.

A conductive material for negative electrodes may be used in the negative-electrode active material layer according to need. The negative-electrode conductive material may be any electron-conductive material which does not impair the evenness of the active material layer. Examples thereof include graphites such as natural graphite (e.g., flaky graphite), artificial graphite, and expandable graphite, carbon blacks such as acetylene black, Ketjen black, channel black, furnace black, lamp black, and thermal black, conductive fibers such as carbon fibers and metal fibers, metal powders such as copper and nickel, and organic conductive materials such as polyphenylene derivatives. Such conductive materials can be incorporated alone or as a mixture thereof.

Especially preferred of those conductive materials are artificial graphite, acetylene black, and carbon fibers. In general, to use a conductive material having an average particle diameter of 3 μm or smaller, in particular 1 μm or smaller, is more effective in inhibiting the formation of coarse particles on the electrode plate. The lower limit of the average particle diameter of the conductive material may be about several nanometers. As long as the conductive material has such an average particle diameter, it produces especially no adverse influence on the performance of the electrode plate.

A filler, dispersant, ion conductor, compression enhancer, and other various additives can be incorporated into the negative-electrode active material layer besides the conductive material. As the filler can be used any fibrous material which does not undergo any chemical change in the battery fabricated. Generally, fibers of an olefin polymer such as polypropylene or polyethylene or of glass, carbon, etc. are used.

In preparing an active-material slurry, an aqueous solvent or an organic solvent is used as a dispersion medium.

Water is generally used as the aqueous solvent. However, an additive such as an alcohol, e.g., ethanol, or a cyclic amide, e.g., N-methylpyrrolidone, may be added to the water in an amount of up to about 30% by weight based on the water.

Examples of the organic solvent generally include cyclic amides such as N-methylpyrrolidone, linear amides such as N,N-dimethylformamide and N,N-dimethylacetamide, aromatic hydrocarbons such as anisole, toluene, and xylene, and alcohols such as butanol and cyclohexanol. Preferred of these are cyclic amides such as N-methylpyrrolidone and linear amides such as N,N-dimethylformamide and N,N-dimethylacetamide.

The active material, an organic material having binding and thickening effects as a binder, and optional ingredients such as a negative-electrode conductive material and a filler are mixed with any of those solvents to prepare an active-material slurry. This slurry is applied to a negative-electrode current collector in a given thickness to thereby form a negative-electrode active material layer.

The upper limit of the concentration of the active material in this active-material slurry is generally 70% by weight or lower, preferably 55% by weight or lower. The lower limit thereof is generally 30% by weight to higher, preferably 40%. by weight or higher. In case where the concentration of the active material exceeds the upper limit, the active material in the active-material slurry is apt to aggregate. In case where the concentration thereof is lower than the lower limit, the active material is apt to sediment during the storage of the active-material slurry.

The upper limit of the concentration of the binder in the active-material slurry is generally 30% by weight or lower, preferably 10% by weight or lower. The lower limit thereof is generally 0.1% by weight or higher, preferably 0.5% by weight or higher. In case where the binder concentration exceeds the upper limit, the electrode has increased internal resistance. In case where the binder concentration is lower than the lower limit, the electrode obtained has poor bonding with electrode particles.

Furthermore, the concentration of the negative-electrode conductive material in the active-material slurry is preferably 0–5% by weight. The concentration of other ingredients including a filler is preferably 0–30% by weight.

The negative-electrode current collector may be any electron conductor which does not undergo any chemical change in the battery fabricated. For example, one made of stainless steel, nickel, copper, titanium, carbon, a conductive resin, or the like may be used, or a material obtained by treating the surface of copper or stainless steel with carbon, nickel, or titanium maybe used. Copper or a copper alloy is especially preferred. These materials may be used after having undergone surface oxidation. It is desirable to subject a current collector to a surface treatment to impart surface irregularities thereto. Besides a foil form, usable forms include film, sheet, net, punched film or sheet, lath, porous material, foam, molded fibers, and the like. The thickness of such a negative-electrode current collector to be used is not particularly limited, and may be 1–500 μm.

In the invention, before the active-material slurry prepared by incorporating the active material, a binder, and optional ingredients into a solvent is applied to a current collector, it maybe filtered through a sieve in order to satisfy the requirement described above that the negative-electrode active material layer should have an average surface roughness (Ra) of 5 μm or lower. In this case, it is preferred that a sieve of generally ASTM 270 mesh (opening size, 53 μm) or finer, preferably ASTM 325 mesh (opening size, 43 μm) or finer, more preferably ASTM 400 mesh (opening size, 35 μm) or finer, be used to conduct a filtering operation generally 1 or more times, preferably 2 or more times. It is preferred that the lower limit of the temperature conditions in this filtration operation be generally 5° C. or higher, especially 10° C. or higher, and the upper limit thereof be 50° C. or lower, especially 30° C. or lower. In case where the temperature conditions exceed the upper limit, the dispersion medium is apt to vaporize. In case where the temperature is lower than the lower limit, the dispersion medium is apt to have an increased viscosity.

In this filtration operation, the lower side of the sieve openings is gradually pressurized to a pressure higher than the atmospheric pressure as the filtration proceeds. It is therefore preferred to periodically open this side to the atmosphere to thereby return the pressure to the atmospheric pressure. The lower side of the sieve may be kept at a reduced pressure. The reduced-pressure conditions in this case preferably include a reduced pressure of about 10–30 Pa. It is also preferred to dispose a scraper on the upper side of the sieve and to stir the dispersion in such a manner that the dispersion is spread on the sieve so as to be always in even contact with the screen openings.

Next, the lithium secondary battery of the invention is explained, which comprises a positive electrode capable of occluding/releasing lithium, a negative electrode capable of occluding/releasing lithium, and an electrolyte and in which the negative electrode is the negative electrode for lithium secondary battery of the invention described above.

Like the negative electrode plate, the positive electrode plate in the lithium secondary battery of the invention comprises a current collector having provided thereon an active material layer comprising a positive-electrode active material and an organic material (binder) having binding and thickening effects (hereinafter, the layer is sometimes referred to as "positive-electrode mix layer"). Like the negative-electrode active material layer, the positive-electrode active material layer is generally formed by a step in which a slurry fluid prepared by dispersing a positive-electrode active material and an organic material having binding and thickening effects in water or an organic solvent is thinly applied to a current collector, e.g., a metal foil, and dried and a subsequent pressing step in which the resultant coating is densified to a given thickness/density.

The positive-electrode active material is not particularly limited as long as it has the function of being capable of occluding/releasing lithium. For example, a lithium-containing transition metal oxide can be used.

Examples of the lithium-containing transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$ (M is at least one member selected from Na, Mg, Sc, Y, Mn, Fe, Co, Ni, Cu, Zn, Al, Cr, Pb, Sb, and B; and x=0–1.2, y=0–0.9, and z=2.0–2.3). In these oxides, x is a value before initiation of charge/discharge, and increases/decreases with charge/discharge. Any of these oxides in which the cobalt, nickel, and manganese have been partly displaced by one or more elements, e.g., other transition metals, can also be used. It is also possible to use other positive-electrode materials such as, e.g., transition metal charcogen compounds, vanadium oxides and lithium compounds thereof, niobium oxides and lithium compounds thereof, conjugated-compound polymers containing an organic conductive substance, and Chevrel-phase compounds. Furthermore, a mixture of two or more different positive-electrode materials can be used. The average particle diameter of the positive-electrode active material particles is not particularly limited, but is preferably 1–30 μm.

A conductive material for positive electrodes may be used in the positive-electrode active material layer. The positive-electrode conductive material may be any electron-conductive material which does not undergo any chemical change at the charge/discharge potentials of the positive-electrode material used. Examples thereof include graphites such as natural graphite (e.g., flaky graphite) and artificial graphite, carbon blacks such as acetylene black, Ketjen black, channel black, furnace black, lamp black, and thermal black, conductive fibers such as carbon fibers and metal fibers, carbon fluorides, metal powders such as aluminum, conductive whiskers such as zinc oxide whiskers and potassium titanate whiskers, conductive metal oxides such as titanium oxide, and organic conductive materials such as polyphenylene derivatives. Such conductive materials can be incorporated alone or as a mixture thereof. Especially preferred of these conductive materials are artificial graphite and acetylene black. The amount of the conductive material to be added is not particularly limited, but it is preferably 1–50% by weight, especially preferably 1–30% by weight, based on the positive-electrode material. In the case of carbon or graphites, the amount thereof is especially preferably 2–15% by weight.

The organic material having binding and thickening effects which is used for forming the positive-electrode active material layer is not particularly limited, may be either a thermoplastic resin or a thermosetting resin. Examples thereof include polyethylene, polypropylene, polytetrafluoroethylene (PTFF), poly(vinylidene fluoride) (PVDF), styrene/butadiene rubbers, tetrafluoroethylene/hexafluoroethylene copolymers, tetrafluoroethylene/hexafluoropropylene copolymers (FEP), tetrafluoroethylene/perfluoro(alkyl vinyl ether) copolymers (PFA), vinylidene fluoride/hexafluoropropylene copolymers, vinyldidene fluoride/chlorotrifluoroethylene copolymers, ethylene/tetrafluoroethylene copolymers (ETFE resins), polychlorotrifluoroethylene (PCTFE), vinylidene fluoride/pentafluoropropylene copolymers, propylene/tetrafluoroethylene copolymers, ethylene/chlorotrifluoroethylene copolymers (ECTFE), vinylidene fluoride/hexafluoropropylne/tetrafluoroethylene copolymers, vinylidene fluoride/perfluoro(methyl vinyl ether)/tetrafluoroethylene copolymers, ethylene/acrylic acid copolymers or these materials crosslinked with ($Na^+$) ions, ethylene/methacrylic acid copolymers or these materials crosslinked with ($Na^+$) ions, ethylene/methyl acrylate copolymers or these materials crosslinked with ($Na^+$) ions, and ethylene/methyl methacrylate copolymers or these materials crosslinked with ($Na^+$) ions. These materials can be used alone or as a mixture thereof. More preferred materials among those materials are poly(vinylidene fluoride) (PVDF) and polytetrafluoroethylene (PTFE).

A filler, dispersant, ion conductor, compression enhancer, and other various additives can be incorporated into the positive-electrode active material layer besides the conductive material. As the filler can be used any fibrous material which does not undergo any chemical change in the battery fabricated. Generally, fibers of an olefin polymer such as polypropylene or polyethylene or of glass, carbon, etc. are used. The amount of the filler to be added is not particularly limited, but is preferably 0–30% by weight in terms of its content in the active material layer.

In preparing a positive-electrode active-material slurry, use may be made of the same aqueous solvent or organic solvent as that described above as the dispersion medium of the negative-electrode active-material slurry.

The active material, an organic material having binding and thickening effects as a binder, and optional ingredients such as a positive-electrode conductive material and a filler are mixed with any of those solvents to prepare an active-material slurry. This slurry is applied to a positive-electrode current collector in a given thickness to thereby form a positive-electrode active material layer.

The upper limit of the concentration of the active material in this active-material slurry is generally 70% by weight or lower, preferably 55% by weight or lower. The lower limit thereof is generally 30% by weight to higher, preferably 40% by weight or higher. In case where the concentration of the active material exceeds the upper limit, the active material in the active-material slurry is apt to aggregate. In case where the concentration thereof is lower than the lower limit, the active material is apt to sediment during the storage of the active-material slurry.

The upper limit of the concentration of the binder in the active-material slurry is generally 30% by weight or lower, preferably 10% by weight or lower. The lower limit thereof is generally 0.1% by weight or higher, preferably 0.5% by weight or higher. In case where the binder concentration exceeds the upper limit, the electrode has increased internal resistance. In case where the binder concentration is lower than the lower limit, the electrode obtained has poor bonding with electrode particles.

The positive-electrode current collector may be any electron conductor which does not undergo any chemical change at the charge/discharge potentials of the positive-electrode material used. For example, one made of stainless steel, aluminum, titanium, carbon, a conductive resin, or the like may be used, or a material obtained by treating the surface of aluminum or stainless steel with carbon or titanium may be used. Aluminum or an aluminum alloy is especially preferred. These materials may be used after having undergone surface oxidation. It is desirable to subject a current collector to a surface treatment to impart surface irregularities thereto. Besides a foil form, usable forms include film, sheet, net, punched film or sheet, lath, porous material, foam, molded fibers or molded nonwoven fabric, and the like. The thickness of such a positive-electrode current collector to be used is not particularly limited, and may be 1–500 μm.

In the lithium secondary battery of the invention, the negative-electrode plate and the positive-electrode plate are preferably arranged at least so that the positive-electrode active material layer faces the negative-electrode active material layer.

Examples of the electrolyte to be used in the lithium secondary battery of the invention include nonaqueous electrolytic solutions constituted of a nonaqueous solvent and one or more lithium salts soluble in the solvent.

Examples of the nonaqueous solvent include a protic organic solvents such as cyclic carbonates, e.g., ethylene carbonate (EC), propylene carbonate (PC), butylene carbonate (BC), and vinylene carbonate (VC), chain carbonates, e.g., dimethyl carbonate (DMC), diethyl carbonate (DEC), ethyl methyl carbonate (EMC), and dipropyl carbonate (DPC), aliphatic carboxylic esters, e.g., methyl formate, methyl acetate, methyl propionate, and ethyl propionate, γ-lactones, e.g., γ-butyrolactone, chain ethers, e.g., 1,2-dimethoxyethane (DME), 1,2-diethoxyethane (DEE), and ethoxymethoxyethane (EME), cyclic ethers, e.g., tetrahydrofuran and 2-methyltetrahydrofuran, dimethyl sulfoxide, 1,3-dioxolane, formamide, acetamide, dimethylformamide, dioxolane, acetonitrile, propinonitrile, nitromethane, ethylmonoglyme, phosphorictriesters, trimethoxymethane, dioxolanederivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, dimethyl sulfoxide, and N-methylpyrrolidone. These may be used alone or as a mixture of two or more thereof. Preferred of these is a mixture of one or more cyclic carbonates and one or more chain carbonates or a mixture of one or more cyclic carbonates, one or more chain carbonates, and one or more aliphatic carboxylic esters.

Examples of the lithium salts soluble in those solvents include $LiClO_4$, $LiBF_4$, $LiPF_6$, $LiAlCl_4$, $LiSbF_6$, LiSCN, LiCl, $LiCF_3SO_3$, $LiCF_3CO_2$, Li $(CF_3SO_2)_2$, $LiAsF_6$, LiN $(CF_3SO_2)_2$, $LiB_{10}Cl_{10}$, the lithium salts of lower aliphatic carboxylic acids, LiCl, LiBr, LiI, chloroborane lithium compounds, lithium tetraphenylborate, and imides. These may be used alone or in combination of two or more thereof. In particular, it is more preferred to incorporate $LiPF_6$.

An especially preferred nonaqueous electrolytic solution in the invention is an electrolytic solution comprising at least ethylene carbonate and ethyl methyl carbonate and containing $LiPF_6$ as a supporting salt.

The amount of such an electrolyte to be introduced into the battery is not particularly limited. The electrolyte can be used in a necessary amount according to the amounts of the positive-electrode material and negative-electrode material and the size of the battery. The amount of the lithium salt to be dissolved as a supporting electrolyte in the nonaqueous solvent is not particularly limited. However, the amount thereof is preferably 0.2–2mol/L, especially preferably 0.5–1.5 mol/L.

Besides the electrolytic solution described above, a solid electrolyte such as those shown below can be used as the electrolyte. Solid electrolytes are classified into inorganic solid electrolytes and organic solid electrolytes. Well known examples of the inorganic solid electrolytes include the nitrides, halides, and oxo acid salts of lithium. Effective of these are $Li_4SiO_4$, $Li_4SiO_4$—LiI—LiOH, $xLi_3PO_4$-(1-x) $Li_4SiO4$, $Li_2SiS_3$, $Li_3PO_4$—$Li_2S$—$SiS_2$, phosphorus sulfide compounds, and the like. Effective examples of the organic solid electrolytes include polymeric materials such as poly (ethylene oxide), poly(propylene oxide), polyphosphazenes, polyaziridine, poly(ethylene sulfide), poly(vinyl alcohol), poly(vinylidene fluoride), polyhexafluoropropylene, and derivatives, mixtures, and composites of these polymers.

It is effective to further add other compounds to the electrolyte for the purpose of improving discharge characteristics or charge/discharge characteristics. Examples of such additives include triethyl phosphite, triethanolamine, cyclic ethers, ethylenediamine, n-glyme, pyridine, hexaphosphoric acid triamide, nitrobenzene derivatives, crown ethers, quaternary ammonium salts, and ethylene glycol dialkyl ethers.

An insulating microporous thin film having high ion permeability and given mechanical strength may be used as a separator in the invention. This separator preferably has the function of closing its pores when heated to or above a given temperature and thereby increasing its resistance. From the standpoints of resistance to organic solvents and hydrophobicity, a sheet, nonwoven fabric, or woven fabric made of an olefin polymer comprising one of or a combination of two or more of polypropylene, polyethylene, and-the like or formed from glass fibers or the like is used as the separator. The pore diameter of the separator desirably is in such a range that the positive/negative electrode material, binder, and conductive material which have shedded from the electrode do not pass through the separator. For example, the pore diameter thereof is desirably 0.01–1 μm. The thickness of the separator to be used is generally 10–300 μm. The porosity is determined according to permeability to electrodes and ions and the material and thickness. It is, however, generally desirable that the porosity of the separator be 30–80%.

Furthermore, a battery may be fabricated in the following manner. An organic electrolytic solution comprising a solvent and a lithium salt soluble in the solvent is absorbed and held in a polymeric material. This polymeric material is incorporated into a positive-electrode mix and a negative-electrode mix. Furthermore, a porous separator constituted of a polymer capable of absorbing and holding the organic electrolytic solution is united with the positive electrode and negative electrode to fabricate a battery. This polymeric material is not particularly limited as long as it can absorb and hold the organic electrolytic solution. However, a copolymer of vinylidene fluoride and hexafluoropropylene is especially preferred.

The upper limit of the thickness of this separator is generally 60 μm or smaller, preferably 50 μm or smaller, more preferably30 μm or smaller. The lower limit thereof is generally 10 μm or larger, preferably 15 μm or larger. In case where the thickness of the separator exceeds the upper limit, the battery is apt to have increased internal resistance. In case where the separator thickness is smaller than the lower limit, short-circuiting is apt to occur between the positive and negative electrodes.

The shape of the lithium secondary battery of the invention is not particularly limited, and may be any of the coin type, button type, sheet type, multilayer type, cylindrical type, flat type, and prismatic type. The battery of the invention is applicable not only to small lithium secondary battery but also to all types of lithium secondary battery including large ones for use in electric motorcars.

The lithium secondary battery of the invention can be used in portable information terminals, portable electronic appliances, domestic small powder storage apparatus, motor bicycles, electric motorcars, hybrid motor vehicles, and the like. However, applications of the battery should not be construed as being especially limited to these.

According to the invention, the increase in internal resistance caused by pulse cycling and the deposition of lithium metal on the negative-electrode surface can be effectively inhibited by using a negative-electrode active material which has a maximum dispersed-particle diameter, as measured with a grind gauge in accordance with JIS K5400, of 50 μm or smaller. For example, when 100,000 cycles of charge/discharge are performed in which each cycle is conducted under the conditions of 10 C (current value at which the quantity of electricity 10 times the battery capacity flows over 1 hour) and 10 second/pulse (10-C current is continued for 10 seconds), then the resultant increase in internal resistance (in other words, the decrease in output) can be reduced to 10% or smaller. Thus, the high-current pulse charge/discharge cycle characteristics of lithium secondary battery can be greatly improved.

Consequently, the invention provides a lithium secondary battery having high-output/high-input characteristics which, when subjected to a pulse charge/discharge cycle test under the high-load current conditions of 10 C, stably undergoes repetitions of charge/discharge even after 200,000 cycles and shows a battery capacity recovery of 70% or higher. The lithium secondary battery of the invention, which shows such high-output/high-input characteristics, is especially suitable for use as a large driving power source for electric drills, cutters, or the like or as a lithium secondary battery for electric motorcars, hybrid motor vehicles, and the like, in particular hybrid motor vehicles, among the wide range of applications of lithium secondary battery shown above.

EXAMPLES

The invention will be explained below in more detail by reference to Examples and Comparative Examples, but the invention should not be construed as being limited by the following Examples in any way unless the invention departs from the spirit thereof.

Example 1

The commercial natural graphite powder described in the row "Example 4" in Table 3 was mixed with a petroleum heavy oil obtained in the thermal cracking of naphtha. This mixture was subjected to a carbonization treatment at 900° C. in an inert gas. Thereafter, the resultant sinter was pulverized/classified to thereby obtain an amorphous-material-coated graphite comprising graphite particles whose surface had been coated with amorphous carbon. In the classification treatment, sieving with an ASTM 400-mesh sieve was repeated 5 times in order to prevent the inclusion of coarse particles to thereby obtain a negative-electrode active-material powder comprising the amorphous-material-coated graphite. It was ascertained from the actual carbon ratio that the negative-electrode active-material powder obtained was constituted of 100 parts by weight of graphite and 2 parts by weight of amorphous carbon with which the graphite was coated.

This active-material powder was subjected to X-ray analysis, Raman spectrometry, examination with a laser diffraction type particle diameter distribution analyzer, measurement of the specific surface area, and various analyses by examination with a grind gauge in accordance with JIS K5400. The results thereof are shown in Table 3.

(1) X-Ray Diffractometry

About 15% by weight high-purity silicon powder as a standard powder for X-rays was added to and mixed with a sample. This mixture was packed in a sample cell, and examined for a wide-angle X-ray diffraction curve by the reflection diffractometer method using a $CuK_\alpha$ line as a monochromatic ray obtained with a graphite monochromator. The wide-angle X-ray diffraction curve obtained by this examination was analyzed to determine the interplanar spacing for the (002) plane ($d_{002}$) and the crystallite size in the C-axis direction ($L_c$) according to the methods of the Japan Society for Promotion of Scientific Research.

(2) Raman Spectroscopy

In Raman spectroscopy using argon ion laser light having a wavelength of 514.5 nm, a sample was examined for the intensity IA for the peak at 1,580–1,620 cm$^{-1}$, the half-value width Δv of the peak, and the intensity IB for the peak at 1,350–1,370 cm$^-$. The ratio between these peak intensities, R=IB/IA, was determined. In sample preparation, the sample in a powder state was packed into a cell by natural falling. While the laser light was kept striking on the surface of the sample in the cell, the cell was rotated in a plane perpendicular to the laser light to conduct the examination.

(3) Measurement of Volume-Based Average Particle Diameter/Maximum Particle Diameter A 2% by volume aqueous solution of polyoxyethylene (20) sorbitan monolaurate was used as a surfactant in an amount of about 1 cc. This surfactant was mixed with an active-material powder beforehand. Thereafter, ion-exchanged water was used as a dispersion medium to measure the volume-based average particle diameter ($D_{50}$) and maximum particle diameter ($D_{max}$) with a laser diffraction type particle size distribution analyzer.

(4) Measurement of Specific Surface Area

A sample was predried by heating at 350° C. and passing nitrogen gas there over for 15 minutes. Thereafter, the specific surface area thereof was measured by the BET one-point method based on nitrogen adsorption at a relative pressure of 0.3.

(5) Measurement with Grind Gauge

Using a 0.8-L planetary-movement twin-screw kneading machine, 100 g of an active-material powder was mixed with 2 g of carboxymethyl cellulose and 200 g of water at a revolution speed of 780 rpm and a rotation speed of 144 rotations and at a temperature of 25° C. for 30 minutes. Subsequently, the dispersion obtained was examined with a grind gauge in accordance with JIS K5400 to measure the maximum dispersed-particle diameter at which particles began to appear and to determine the number of 35–50 μm particles from the number of streak lines formed by coarse particles. Furthermore, the average dispersed-particle diameter was measured, which was the particle diameter at which the proportion of streak lines in the gauge width direction reached 50% or more.

Subsequently, the amorphous-material-coated graphite powder obtained was used as a negative-electrode active material to fabricate a battery in the following manner. The surface roughness of the negative-electrode plate was measured and battery performances were evaluated, by the methods which will be shown later. The results obtained are shown in Table 3.

[Production of Positive Electrode]

Ninety percents by weight lithium nickelate ($LiNiO_2$) as a positive-electrode active material was mixed with 5% by weight acetylene black as a conductive material and 5% by weight poly(vinylidene fluoride) (PVdF) as a binder in N-methylpyrrolidone solvent to prepare a slurry. Thereafter, the slurry was applied to each side of a 20 μm-thick aluminum foil and dried. The coated aluminum foil was rolled with a pressing machine so as to result in a thickness of 70 μm. A strip having a width of 52 mm and a length of 830 mm was cut out of this coated foil to obtain a positive electrode.

[Production of Negative Electrode]

To 94 parts by weight of the negative-electrode active material were added 3 parts by weight on a solid basis of carboxymethyl cellulose and 3 parts by weight on a solid basis of a styrene/butadiene rubber (SBR). This mixture was mixed with distilled water as a dispersion medium with stirring to obtain a negative-electrode active-material slurry. Usually, the slurry obtained was already in an evenly mixed state. However, the slurry was filtered (strained) through an ASTM 325-mesh sieve (opening size, 43 μm) 3 times according to need. By the straining, aggregates of the active-material powder which rarely remain in the slurry can be disaggregated/removed. This negative-electrode active-material slurry was evenly applied to a 18 μm-thick copper foil and dried. Thereafter, the coated foil was rolled with a pressing machine so as to result in a thickness of 40 μm. A strip having a width of 56 mm and a length of 850 mm was cut out of this coated foil to obtain a negative electrode. These operations were conducted in a 25° C. atmosphere.

[Preparation of Electrolytic Solution]

In a dry argon atmosphere, sufficiently dried lithium hexafluorophosphate ($LiPF_6$) was dissolved as an electrolyte in a concentration of 1 mol/L in a mixed solvent consisting of purified ethylene carbonate (EC), dimethyl carbonate (DMC), and diethyl carbonate (DEC) in a volume ratio of 3:3:4. Thus, an electrolytic solution was obtained.

[Battery Fabrication]

The positive and negative electrodes and a porous polyethylene sheet as a separator (thickness, 25 μm) sandwiched between these were wound into a roll to obtain an electrode group, which was put in a battery can. This battery can was sealed. Thereafter, 5 mL of the electrolytic solution was introduced into the battery can having the electrode group packed therein, and was sufficiently infiltrated into the electrodes. This battery can was caulked to produce a 18650 type cylindrical battery.

(6) Measurement of Surface Roughness of Negative Electrode Plate

The negative electrode produced was examined for surface roughness with a laser microscope. The surface roughness was measured over a range which was about 10 times the average particle diameter ($D_{50}$) of the negative-electrode active material as measured with a laser diffraction type particle diameter distribution analyzer, and this measurement was repeated 5 times. In Example 1, a range of 100 μm was examined. The arithmetic mean roughness (Ra) was calculated for the data of each measurement in accordance with JIS B0601 B, and the average of these roughness values was taken as surface roughness (Ra).

(7) Evaluation of Battery Performances

1) Initial Charge/Discharge

A charge/discharge operation (capacity ascertainment) was conducted in a 25° C. room-temperature atmosphere. Based on the results thereof, the charged state of each lithium secondary battery was adjusted to 50%.

2) Evaluation of Initial Output

In a 25° C. room-temperature atmosphere, the battery in the state 1) was discharged for 10 seconds at a constant current which was each of ¼ C, ½ C, 1.0 C, 1.5 C, 2.5 C, and 3.0 C (the value of current at which the rated capacity based on 1-hour-rate discharge capacity is discharged over 1 hour is taken as 1 C; the same applies hereinafter). The decrease in voltage through the 10-second discharge at each current was measured. From these found values, the value of current I capable of being caused to flow for 10 seconds under the conditions of a final discharge voltage of 3.0 V was calculated. The value calculated using the formula 3.0×I (W) was taken as the initial output of each battery. In Table 1 is shown the output in terms of output ratio, with the output of the battery of Comparative Example 1, which will be given later, being 100%.

3) High-Temperature Cycle Test

A high-temperature cycle test was conducted in a high-temperature atmosphere of 60° C., which is regarded as the upper-limit temperature for the actual use of lithium secondary battery. The battery which had undergone the output evaluation in 2) above was charged by the constant-current constant-voltage method at 2 C to a final charge voltage of 4.1 V and then discharged at a constant current of 2 C to a final discharge voltage of 3.0 V. This charge/discharge operation as one cycle was repeated to conduct 500 cycles in total. The proportion of the discharge capacity for the 500th cycle to the discharge capacity for the 1st cycle in this test was taken as capacity retention.

4) Pulse Cycle Test

A pulse cycle test was conducted in a 25° C. room-temperature atmosphere. The battery which had undergone the output evaluation in 2) above was regulated so as to be in a 50% charged state. A high-load current of 10 C was caused to flow in the charge direction and the discharge direction each for about 10 seconds in a voltage range including that voltage at the center. This cycle, which took 15 seconds including a pause period, was successively repeated. At the time when the number of cycles had reached 100,000, the battery was taken out and the recovery after the pulse cycling was calculated in the following manner. At a current of ½ C, the battery was discharged to 3.0 V, subsequently charged to 4.1 V, and then discharged to 3.0 V again. The proportion of the discharge capacity in this charge/discharge to the discharge capacity in the initial charge/discharge in 1) above was taken as recovery.

Example 2

A negative-electrode active-material powder was prepared in the same manner as in Example 1, except that an amorphous-material-coated graphite powder constituted of 100 parts by weight of graphite and 8 parts by weight of amorphous carbon was produced. Various evaluations were conducted in the same manner as in Example 1. The results thereof are shown in Table 3.

Example 3

A negative-electrode active-material powder was prepared in the same manner as in Example 1, except that an amorphous-material-coated graphite powder constituted of 100 parts by weight of graphite and 18 parts by weight of amorphous carbon was produced. Various evaluations were conducted in the same manner as in Example 1. The results thereof are shown in Table 3.

Example 4

A negative-electrode active-material powder was prepared in the same manner as in Example 1, except that a commercial natural-graphite powder was classified. Various evaluations were conducted in the same manner as in Example 1. The results thereof are shown in Table 3.

Example 5

A negative-electrode active-material powder was prepared in the same manner as in Example 1, except that the amorphous-material-coated graphite powder prepared in Comparative Example 1 given later, which as a whole had a large particle diameter, was passed through an ASTM 400-mesh sieve 5 times to precisely remove coarse particles therefrom. Various evaluations were conducted in the same manner as in Example 1. The results thereof are shown in Table 3.

Example 6

A negative-electrode active-material powder was prepared in the same manner as in Example 1, except that the artificial-graphite powder described in Comparative Example 2 given later, which was constituted of many fine graphite particles isotropically bonded to one another through a graphitized binder pitch, was passed through an ASTM 400-mesh sieve 5 times to precisely remove coarse particles therefrom. Various evaluations were conducted in the same manner as in Example 1. The results thereof are shown in Table 3.

Example 7

A negative-electrode active-material powder was prepared in the same manner as in Example 1, except that a commercial amorphous-carbon powder was classified. Various evaluations were conducted in the same manner as in Example 1. The results thereof are shown in Table 3.

Comparative Example 1

Various evaluations were conducted in the same manner as in Example 1, except that an amorphous-material-coated graphite powder which as a whole had a large particle diameter was used as a negative-electrode active material. The results thereof are shown in Table 3.

In this procedure, a straining operation was conducted prior to application of the negative-electrode active-material slurry. As a result, many coarse particles remained on the sieve. However, this operation, when conducted alone, cannot sufficiently remove coarse particles. The grind gauge test resulted in many streak lines remaining on the gauge.

The battery obtained had a low value of initial output. In the pulse cycle test, the battery voltage decreased to 3 V or lower during examination before the number of cycles reached 200,000. Because of this, the cycle test was stopped. This abnormal voltage was presumed to be caused by local short-circuiting within a battery element.

Comparative Example 2

Many fine graphite particles were dispersed in a binder pitch. This dispersion was subjected to graphitization and powder processing to thereby produce an artificial-graphite powder constituted of graphite isotropically bonded to one another through a graphitized binder pitch. Various evaluations were conducted in the same manner as in Example 1, except that this artificial-graphite powder was used as a negative-electrode active-material powder. The results thereof are shown in Table 3.

The battery obtained was evaluated and, as a result, the pulse cycle test was stopped as in Comparative Example 1.

Comparative Example 3

Various evaluations were conducted in the same manner as in Example 1, except that the amorphous-material-coated graphite powder described in Comparative Example 1, which as a whole had a large particle diameter, was passed through an ASTM 400-mesh sieve once and this powder was used as a negative-electrode active-material powder. The results thereof are shown in Table 3.

The battery obtained was evaluated and, as a result, the pulse cycle test was stopped as in Comparative Example 1.

TABLE 3

| | | | Negative-electrode active-material powder | | | | | | |
|---|---|---|---|---|---|---|---|---|---|
| | | | Properties | | | | | | |
| | | | | | | | Laser diffraction | | |
| Example | | Kind | $d_{002}$ (nm) | $L_c$ (nm) | Value of R (-) | $\Delta v$ (cm$^{-1}$) | Average particle diameter ($D_{50}$) (μm) | Maximum particle diameter ($D_{max}$) (μm) | BET specific surface area (m$^2$/g) |
| Example | 1 | Amorphous coated graphite powder | 0.336 | ≧100 | 0.33 | 29.0 | 11 | 32 | 5.5 |
| | 2 | Amorphous coated graphite powder | 0.336 | ≧100 | 0.41 | 35.6 | 11 | 34 | 3.7 |
| | 3 | Amorphous coated graphite powder | 0.336 | ≧100 | 0.61 | 59.0 | 12 | 34 | 2.0 |
| | 4 | Natural graphite powder | 0.335 | ≧100 | 0.16 | 25.8 | 11 | 39 | 10.6 |
| | 5 | Amorphous coated graphite powder | 0.336 | ≧100 | 0.38 | 36.0 | 15 | 68 | 2.3 |
| | 6 | Fine graphite composite powder | 0.335 | ≧100 | 0.16 | 24.3 | 13 | 45 | 4.8 |

TABLE 3-continued

|  |  |  | | | | | | |
|---|---|---|---|---|---|---|---|---|
| | 7 | Amorphous carbon powder | 0.345 | 3.8 | 0.99 | 54.3 | 11 | 38 | 7.0 |
| Comparative Example | 1 | Amorphous coated graphite powder | 0.336 | ≧100 | 0.38 | 36.0 | 22 | 101 | 2.3 |
| | 2 | Fine graphite composite powder | 0.335 | ≧100 | 0.16 | 24.3 | 17 | 90 | 4.7 |
| | 3 | Amorphous coated graphite powder | 0.336 | ≧100 | 0.38 | 36.0 | 21 | 90 | 2.3 |

| | | Negative-electrode active-material powder | | | Surface roughness of negative electrode plate (Ra) (μm) | Battery performance | | |
|---|---|---|---|---|---|---|---|---|
| | | Properties | | | | | | |
| | | Examination with grind gauge | | | | | Capacity | |
| Example | | Maximum dispersed particle diameter (μm) | Number of 35–50 μm particles | Average dispersed particle diameter (μm) | | Initial output (%) | retention in high temperature cycling (%) | Recovery after pulse cycling (%) |
| Example | 1 | 25 | 0 | 20 | 2 | 161 | 84 | 85 |
| | 2 | 25 | 0 | 20 | 2 | 150 | 88 | 88 |
| | 3 | 25 | 0 | 20 | 2 | 156 | 89 | 88 |
| | 4 | 35 | 1 | 25 | 1 | 156 | 83 | 78 |
| | 5 | 50 | 8 | 30 | 3 | 150 | 86 | 86 |
| | 6 | 40 | 9 | 30 | 3 | 156 | 82 | 73 |
| | 7 | 40 | 15 | 30 | 3 | 122 | 89 | 90 |
| Comparative Example | 1 | 70 | >20 | 60 | 8 | 100 | 80 | stopped* |
| | 2 | 60 | >20 | 50 | 8 | 106 | 80 | stopped* |
| | 3 | 60 | >20 | 50 | 8 | 100 | 82 | stopped* |

*abnormal voltage

While the invention has been described in detail and with reference to specific embodiments thereof, it will be apparent to one skilled in the art that various changes and modifications can be made therein without departing from the spirit and scope thereof.

This application is based on a Japanese patent application filed on Feb. 20, 2003 (Application No. 2003-42985), the entire contents thereof being herein incorporated by reference.

INDUSTRIAL APPLICABILITY

According to the negative-electrode active material for lithium secondary battery of the invention, an active material layer which, even when as thin as 50 μm or less, is even and free from the problem of lithium metal deposition in repetitions of charge/discharge can be formed. The negative electrode for lithium secondary battery of the invention, which has an active material layer having a thickness as small as 50 μm or below and, despite this, having a highly even surface, can have a reduced thickness, a prolonged life, and improved safety. The lithium secondary battery provided by the invention, which employs this negative electrode, has excellent high-output/high-input characteristics and a long life and is highly safe.

The lithium secondary battery of the invention, which has such properties, is extremely useful industrially as, e.g., a lithium secondary battery for automotive use in which high-output characteristics are especially required.

The invention claimed is:

1. A negative electrode for lithium secondary battery, comprising:
   a current collector having provided thereon an active material layer comprising an active material and an organic material having binding and thickening effects, wherein
   (1) the active material is in such a carbonaceous powder form that when a dispersion prepared by dispersing 100 g of the active-material powder in 200 g of water together with 2 g of carboxymethyl cellulose is examined by the grind gauge method for determining the degree of dispersion in accordance with JIS K5400, the maximum dispersed particle diameter is 50 μm or smaller,
   (2) the active material layer has a thickness of 50 μm or smaller, and
   (3) the active material layer has an arithmetic mean roughness (Ra) as measured in accordance with JIS B0601 of 5 μm or smaller;
   wherein the active material comprises an amorphous material in which an interplanar spacing $d_{002}$ for a crystal face (002) is 0.349 nm or larger and a thickness of superposed layers $L_c$ is smaller than 10 nm.

2. The negative electrode as claimed in claim 1, wherein an average particle diameter ($D_{50}$) in a volume-based particle diameter distribution of the active material is 5 to 20 μm.

3. The negative electrode as claimed in claim 1, wherein a BET specific surface area of the active material as measured by a nitrogen gas adsorption method is 1 to 13 m²/g.

4. The negative electrode as claimed in claim 1, wherein the active material is comprises a graphite powder in which an interplanar spacing $d_{002}$ for the crystal face (002) is 0.348 nm or smaller and a thickness of superposed layers $L_c$ is 10 nm or larger.

5. The negative electrode as claimed in claim 1, wherein the active material comprises a graphitic/amorphous composite material.

6. The negative electrode as claimed in claim 1, wherein the active material comprises a graphitic powder and an amorphous powder.

7. The negative electrode as claimed in claim 1, wherein the active material comprise 50% by weight or more of a graphitic powder.

8. The negative electrode as claimed in claim 1, wherein the active material comprises 40% by weight or less of an amorphous powder.

9. The negative electrode as claimed in claim 1, wherein the active material layer is on each side of the current collector.

10. The negative electrode as claimed in claim 1, wherein the active material layer has a density of 0.9 to 2.2 g/cm$^3$.

11. The negative electrode as claimed in claim 1, wherein the active material comprises 40% by weight or less of an amorphous powder.

12. A lithium secondary battery, comprising:
a positive electrode capable of occluding/releasing lithium,
a negative electrode capable of occluding/releasing lithium, and
an electrolyte,
wherein the negative electrode is the negative electrode for lithium secondary battery according to claim 3.

13. A negative electrode for lithium secondary battery, comprising:
a current collector having provided thereon an active material layer comprising an active material and an organic material having binding and thickening effects, wherein
(1) the active material is in such a carbonaceous powder form that when a dispersion prepared by dispersing 100 g of the active-material powder in 200 g of water together with 2 g of carboxymethyl cellulose is examined by the grind gauge method for determining the degree of dispersion in accordance with JIS K5400, the maximum dispersed particle diameter is 50 µm or smaller,
(2) the active material layer has a thickness of 50 µm or smaller, and
(3) the active material layer has an arithmetic mean roughness (Ra) as measured in accordance with JIS B060 1 of 5 µm or smaller;
wherein the active material comprises a graphitic/amorphous composite material.

14. The negative electrode as claimed in claim 13, wherein an average particle diameter ($D_{50}$) in a volume-based particle diameter distribution of the active material is 5 to 20 µm.

15. The negative electrode as claimed in claim 13, wherein a BET specific surface area of the active material as measured by a nitrogen gas adsorption method is 1 to 13 m$^2$/g.

16. The negative electrode as claimed in claim 13, wherein the active material is comprises a graphite powder in which an interplanar spacing $d_{002}$ for the crystal face (002) is 0.348 nm or smaller and a thickness of superposed layers $L_c$ is 10 nm or larger.

17. The negative electrode as claimed in claim 13, wherein the active material comprises a graphitic!amorphous composite material.

18. The negative electrode as claimed in claim 13, wherein the active material comprises a graphitic powder and an amorphous powder.

19. The negative electrode as claimed in claim 13, wherein the active material comprise 50% by weight or more of a graphitic powder.

20. The negative electrode as claimed in claim 13, wherein the active material comprises 40% by weight or less of an amorphous powder.

21. The negative electrode as claimed in claim 13, wherein the active material layer is on each side of the current collector.

22. The negative electrode as claimed in claim 13, wherein the active material layer has a density of 0.9 to 2.2 g/cm$^3$.

23. The negative electrode as claimed in claim 13, wherein the active material comprises 40% by weight or less of an amorphous powder.

24. A negative electrode for lithium secondary battery, comprising:
a current collector having provided thereon an active material layer comprising an active material and an organic material having binding and thickening effects, wherein
(1) the active material is in such a carbonaceous powder form that when a dispersion prepared by dispersing 100 g of the active-material powder in 200 g of water togeth&r with 2 g of carboxymethyl cellulose is examined by the grind gauge method for determining the degree of dispersion in accordance with JIS K5400, the maximum dispersed particle diameter is 50 µm or smaller,
(2) the active material layer has a thickness of 50 µm or smaller, and
(3) the active material layer has an arithmetic mean roughness (Ra) as measured in accordance with JIS B0601 of 5 µm or smaller;
wherein the active material comprises a graphitic powder and an amorphous powder.

25. A lithium secondary battery, comprising:
a positive electrode capable of occluding/releasing lithium,
a negative electrode capable of occluding/releasing lithium, and
an electrolyte,
wherein the negative electrode is the negative electrode for lithium secondary battery according to claim 13.

* * * * *